(12) United States Patent
Black et al.

(10) Patent No.: US 6,526,156 B1
(45) Date of Patent: Feb. 25, 2003

(54) APPARATUS AND METHOD FOR IDENTIFYING AND TRACKING OBJECTS WITH VIEW-BASED REPRESENTATIONS

(75) Inventors: Michael J. Black, Menlo Park, CA (US); Allan D. Jepson, Oakville (CA)

(73) Assignee: Xerox Corporation, Stamford, CT (US)

( * ) Notice: Subject to any disclaimer, the term of this patent is extended or adjusted under 35 U.S.C. 154(b) by 755 days.

(21) Appl. No.: 08/923,436

(22) Filed: Sep. 3, 1997

Related U.S. Application Data
(60) Provisional application No. 60/035,288, filed on Jan. 10, 1997.

(51) Int. Cl.[7] .................................................. G06K 9/00
(52) U.S. Cl. ........................................ 382/103; 382/115
(58) Field of Search ................................ 382/103, 107, 382/115, 118, 228, 276, 294

(56) References Cited

U.S. PATENT DOCUMENTS

| | | | |
|---|---|---|---|
| 5,164,992 A | | 11/1992 | Turk et al. ...................... 382/2 |
| 5,432,864 A | | 7/1995 | Lu et al. ...................... 382/118 |
| 5,469,512 A | | 11/1995 | Fujita et al. ................ 382/118 |
| 5,710,833 A | * | 1/1998 | Moghaddam et al. ........ 382/228 |
| 5,802,220 A | * | 9/1998 | Black et al. ................. 382/276 |

OTHER PUBLICATIONS

Jebara et al. "Parametrized structure from motion for 3D adaptive feedback tracking of faces" Computer Vision and Pattern Recognition, 1997 IEEE Computer Scciety Conference, Jun. 1997.*

Bichsel et al. "Human Face Recognition and the Face Image Set's Topology" Image Understanding vol. 59 No. 2, pp. 254–261, Mar. 1994.*

Adelson, E. H. and J. R. Bergen. "The Plenoptic Function and the Elements of Early Vision." In M. Landy and J. A. Movshon, editors, *Computational Models of Visual Processing*, pp. 1–20, Cambridge, MA, 1991. MIT Press.

Baumberg, A. and D. Hogg. "Learning Flexible Models from Image Sequences." In J. Eklundh, editor, *European Conference on Computer Vision*, ECCV–94, vol. 800 of LNCS–Series, pp. 299–308, Stockholm, Sweden, 1994. Springer–Verlag.

(List continued on next page.)

*Primary Examiner*—Jingge Wu

(57) ABSTRACT

A system tracks and identifies view-based representations of an object through a sequence of images. As the view of the object changes due to its motion or the motion of its recording device, the object is identified by matching an image region containing the object with a set of basis images represented by an eigenspace. The eigenspace is generated from a training set of images which records different views of the object. The system identifies the object in the image region by simultaneously computing a transformation that aligns the image region with the eigenspace, and computing coefficients of a combination of linear eigenvectors that reconstruct the image region. This identification and tracking system operates when views of the object in the image are deformed under some transformation with respect to the eigenspace. Matching between the image region and the eigenspace is performed using a robust regression formulation that uses a coarse to fine strategy with incremental refinement. As the incremental refinement registers the image region with the eigenspace, the identification of a match between the object in an image region and the eigenspace improves. The transformation that warps the image region of a current image frame into alignment with the eigenspace is then used to track the object in a subsequent image frame.

20 Claims, 14 Drawing Sheets

OTHER PUBLICATIONS

Bergen, J. R., P. Anandan, K. J. Hanna, and R. Hingorani. "Hierarchical Model–Based Motion Estimation." In G. Sandini, editor, *Proceedings of Second European Conference on Computer Vision*, ECCV–92, vol. 588 of LNCS–Series, pp. 237–252. Springer–Verlag, May 1992.

Black, M. J. and P. Anandan. "A Framework for the Robust Estimation of Optical Flow." In *Proceedings of Fourth International Conference on Computer Vision*, ICCV–93, pp. 231–236, Berlin, Germany, May 1993.

Black, M. J. and P. Anandan. "The Robust Estimation of Multiple Motions: Affine and Piecewise–Smooth Flow Fields." Technical Report P93–00104, Xerox PARC, Dec. 1993.

Black, M. J. and Y. Yacoob. "Tracking and Recognizing Rigid and Non–Rigid Facial Motions Using Local Parametric Models of Image Motions." In *Proceedings of the Fifth International Conference on Computer Vision*, pp. 374–381. Boston, MA, Jun. 1995.

Blake, A., M. Isard, and D. Reynard, "Learning to Track Curves in Motion." *Proceedings of the IEEE Conference on Decision Theory and Control*, vol. 4, pp. 3788–3793, Florida, 1994.

Bobick, A. F. and A. D. Wilson. "A State–based Technique for the Summarization and Recognition of Gesture." In *Proceedings of the Fifth International Conference on Computer Vision*, pp. 382–388, Cambridge, MA, Jun. 1995.

Bregler, C. and S. M. Omohundro. "Surface Learning with Applications to Lip Reading." In J.D. Cowan, G. Tesauro, and J. Alspector, editors, *Advances in Neural Information Processing Systems 6*, pp. 43–50. San Francisco, CA, 1994. Morgan Kaufmann Publishers.

Jepson, A. and M. J. Black. "Mixture Models for Optical Flow Computation." In I. Cox, P. Hansen, and B. Julesz, editors, *Partitioning Data Sets: With Applications to Psychology, Vision and Target Tracking*, pp. 271–286, DIMACS Workshop, Apr. 1993. AMS Pub., Providence, RI.

Koller, D., K. Daniilidis, and H. H. Nagel. "Model–Based Oject Tracking in Monocular Image Sequences of Road Traffic Scenes." *International Journal of Computer Vision*, 10(3):257–281, 1993.

Kollnig, H. and H. H. Nagel. "3D Pose Estimation by Fitting Image Gradients Directly to Polyhedral Models." In *Proceedings of the Fifth International Conference on Computer Vision*, pp. 569–574, Cambridge, MA, Jun. 1995.

Li, G. "Robust Regression." D.C. Hoaglin, F. Mosteller, and J. W. Tukey, editors, *Exploring Data, Tables, Trends and Shapes*, NY, 1985. John Wiley & Sons.

Moghaddam, B. and A. Pentland. "Probabilistic Visual Learning for Object Detection." In *Proceedings of the Fifth International Conference on Computer Vision*, pp. 786–793, Cambridge, MA, Jun. 1995.

Murase, H. and S. Nayar. "Visual Learning and Recognition of 3–D Objects from Appearance." *International Journal of Computer Vision*, 14:5–24, 1995.

Pentland, A., B. Moghaddam, and T. Stamer. "View–Based and Modular Eigenspaces for Face Recognition." In *Proceedings of the 1994 IEEE Computer Society Conference on Computer Vision and Pattern Recognition*, CVPR–94, Seattle, WA, Jun. 1994.

Saund, E. "A Multiple Cause Mixture Model for Unsupervised Learning." In *Neural Computation*, vol. 7, pp. 51–71, 1995.

Sawhney, H. S., S. Ayer, and M. Gorkani. "Model–based 2D & 3D Dominant Motion Estimation for Mosaicing and Video Representation." In *Proceedings of the Fifth International Conference on Computer Vision*, pp. 583–590, Cambridge, MA, Jun. 1995.

Sullivan, G. "Model–Based Vision for Traffic Scenes Using the Ground–Plane Constraint." In C. Brown and D. Terzopoulos, editors, *Real–Time Computer Vision*, pp. 93–115, 1995.

Szeliski, R. "Image Mosaicing for Tele–Reality Applications." In *Proceedings of the Second IEEE Workshop on Applications of Computer Vision*, pp. 44–53, 1994.

Tarr, M. J. and S. Pinker. "Mental Rotation and Orientation––Dependence in Shape Recognition." *Cognitive Psychology*, 21:233–282, 1989.

Terzopoulos, D. "Analysis and Synthesis of Facial Image Sequences Using Physical and Anatomical Models." IEEE Transaction on Pattern Analysis and Machine Intelligence, vol. 15, No. 6, pp. 569–579, Jun. 1993.

Turk, M. and A. Pentland. Face Recognition Using Eigenfaces. In Proceedings of *1991 IEEE Computer Society Conference on Computer Vision and Pattern Recognition*, CVPR–91, pp. 586–591, Maui, Hawaii, Jun. 1991.

\* cited by examiner

APPARATUS AND METHOD FOR IDENTIFYING AND TRACKING OBJECTS WITH VIEW-BASED REPRESENTATIONS

CROSS-REFERENCE TO RELATED APPLICATION

Priority for the instant application is claimed from U.S. Provisional Application No. 60/035,288 filed Jan. 10, 1997 by the same inventors and assignee.

BACKGROUND OF THE INVENTION

1. Field of the Invention

The present invention relates generally to computer vision, and more particularly to a method and apparatus for tracking an object moving through a sequence of images while identifying the object and changes of view of the object.

2. Description of Related Art

Different techniques have been developed for tracking an object moving through a sequence of images. The motion of an object through a sequence of images can be both rigid and articulated. An object with rigid motion moves cohesively from one position in a frame to another. An object with articulated motion, on the other hand, tends to deform as it moves between frames. For example, the motion of a hand is both articulated and rigid. Besides recognizing the motion of an object in a sequence of images, techniques have been developed for recognizing the changing appearance of an object between image frames. For example, in addition to tracking the position of a hand between image frames, the shape of the hand is sought to be identified. Techniques for tracking objects, therefore, attempt not only to track the object but also to recognize any change in appearance of the object between image frames.

Parameterized optical flow estimation is one method for tracking an object as it moves in a sequence of images. As disclosed by Adelson et al. in an article entitled "The Plenoptic Function and The Elements of Early Vision," published in Computation Models of Visual Processing pp. 1–20, Boston, Mass., 1991, MIT Press (Landy et al. Editors), these techniques treat an image region containing an object as moving "stuff". Consequently, these techniques are unable to distinguish between changes in "viewpoint" or configuration (i.e., appearance) of the object and changes in "position" relative to a recording device. More specifically, these optical flow techniques represent image motion in terms of some low-ordered polynomial (e.g. an affine transformation). A disadvantage of optical flow techniques is that tracking may fail when the initial viewpoint of an object is used for tracking changes between frames.

Another method for tracking an object through a sequence of images is with template matching techniques. Template matching techniques give rise to a "thing" being tracked through an image sequence. These template matching techniques are typically limited to situations in which the motion of the object through the sequence of images is simple and the viewpoint of the object is either fixed or changes slowly. A disadvantage, therefore, of these template matching techniques is that if the view of the object being tracked changes significantly through the sequence of images, then the "thing" being tracked may no longer be recognizable and the tracking may fail.

Yet another method for tracking an object through a sequence of images is with three dimensional modeling techniques. Three dimensional modeling techniques tend to track rigid objects effectively. For example, three dimensional modeling works well when tracking rigid objects such as cars. However, performance of three dimensional modeling techniques degrades significantly when tracking an articulated object such as a hand because the modeling becomes computationally expensive. Another disadvantage is that, it may be difficult to automatically construct a three dimensional model of the object to be tracked. An aspect of three dimensional modeling is that it encodes the structure of an object but not necessarily its appearance. This aspect of three dimensional modeling may be disadvantageous when pertinent features of an object are not its structure but the object's texture and markings.

Besides the aforementioned methods for tracking an object through a sequence of images, a number of techniques have been used to determine the appearance of an object. These include techniques that focus on an object's structure (i.e., object-centered structural descriptions) and techniques that focus on an object's view (i.e., view-based object representations). One method for making view-based determinations of an object representation is through the use of an eigenspace. In general, an eigenspace defines a set of orthogonal basis vectors. A linear combination of these basis vectors can then be used to approximate an image. Because the basis vectors are orthogonal to each other, each basis vector adds information to the whole as defined by the value of its coefficient.

Eigenspaces have been used to initially locate an object in an image, as disclosed by Turk et al. in U.S. Pat. No. 5,164,992 (also published in "Face Recognition Using Eigenfaces", Proc. Computer Vision and Pattern Recognition, CVPR-91, pp. 586–591, Maui, June 1991). More specifically, Turk et al. discloses a system that uses an eigenspace to perform global searching by comparing an input image with the eigenspace at every image location. Global searching is extended by Moghaddam et al. in "Probabilistic Visual Learning For Object Detection," Proceedings of the International Conference on Computer Vision, pp. 786–793, Boston, Mass., June 1995. Moghaddam et al. extends the global search idea to include scale by matching the input at different scales using a standard eigenspace approach.

In addition, many eigenspace approaches require that the object is located and cleanly segmented from the background of the image before the image can be matched with the eigenspace. This segmentation is performed so that reconstruction and recognition of the object is more accurate since it is based on the object and not the image background. Consequently, most eigenspace approaches require that an object is located in the image, segmented from its image background, and transformed into a predetermined form before the object can be matched with an eigenspace. Initially, the predetermined form or view of an object includes its position, orientation and resolution (i.e., scale).

Some eigenspace approaches such as that disclosed by Murase et al., however, have been used to avoid rotating an image into a predetermined orientation in preparation for matching. Specifically, Murase et al. disclose such a technique in "Visual Learning and Recognition of 3-D Objects from Appearance," International Journal of Computer Vision, 14:5–24, 1995. Briefly, Murase et al. discloses the construction of an eigenspace from a training set of images that represent every possible viewpoint of an object. This multiple viewpoint eigenspace eliminates the need for orienting an object before matching it with the eigenspace. In addition, this multiple viewpoint eigenspace can be used to identify changes in view.

Many of the aforementioned view-based matching systems that are used for recognizing objects are limited in certain respects. Some of these view-based systems are affected by image transformations such as translation, scaling, and rotation. Other of these view-based matching systems perform separate operations to segment an object from an image and transform the object into a predetermined form for matching with an eigenspace. Additionally, some of these methods for matching require a large set of views of the object for accurate matching. It would, therefore, be desirable to provide a method and apparatus for tracking an object in a sequence of images using a view-based representation of objects that does not require a large set of views while recognizing both changes in viewpoint and changes in position. Furthermore, it would be advantageous for this method and apparatus to simultaneously perform operations for transforming an object into its predetermined form for matching and operations for matching the object with an eigenspace.

SUMMARY OF THE INVENTION

In accordance with the invention there is provided an apparatus, and method and article of manufacture therefor, for identifying and tracking an object recorded in a sequence of images. A memory of the apparatus is used to store a set of training images. Each image in the training set of images records a different view of the object in the sequence of images. A set of basis images is generated for the set of training images stored in the memory. The generated set of basis images is used to characterize variations of the views of the object in the set of training images. Each image in the sequence of images is evaluated to identify changes in view and structure of the object while tracking the object through the sequence of images. Changes in view and structure of the object in an image in the sequence of images is identified by aligning and matching a view of the object in the image with the views of the object represented in the set of basis images.

BRIEF DESCRIPTION OF THE DRAWINGS

These and other aspects of the invention will become apparent from the following description which illustrates a preferred embodiment of the invention read in conjunction with the accompanying drawings wherein the same reference numerals have been applied to like parts and in which.

DETAILED DESCRIPTION

A. System Overview

Figure 1:
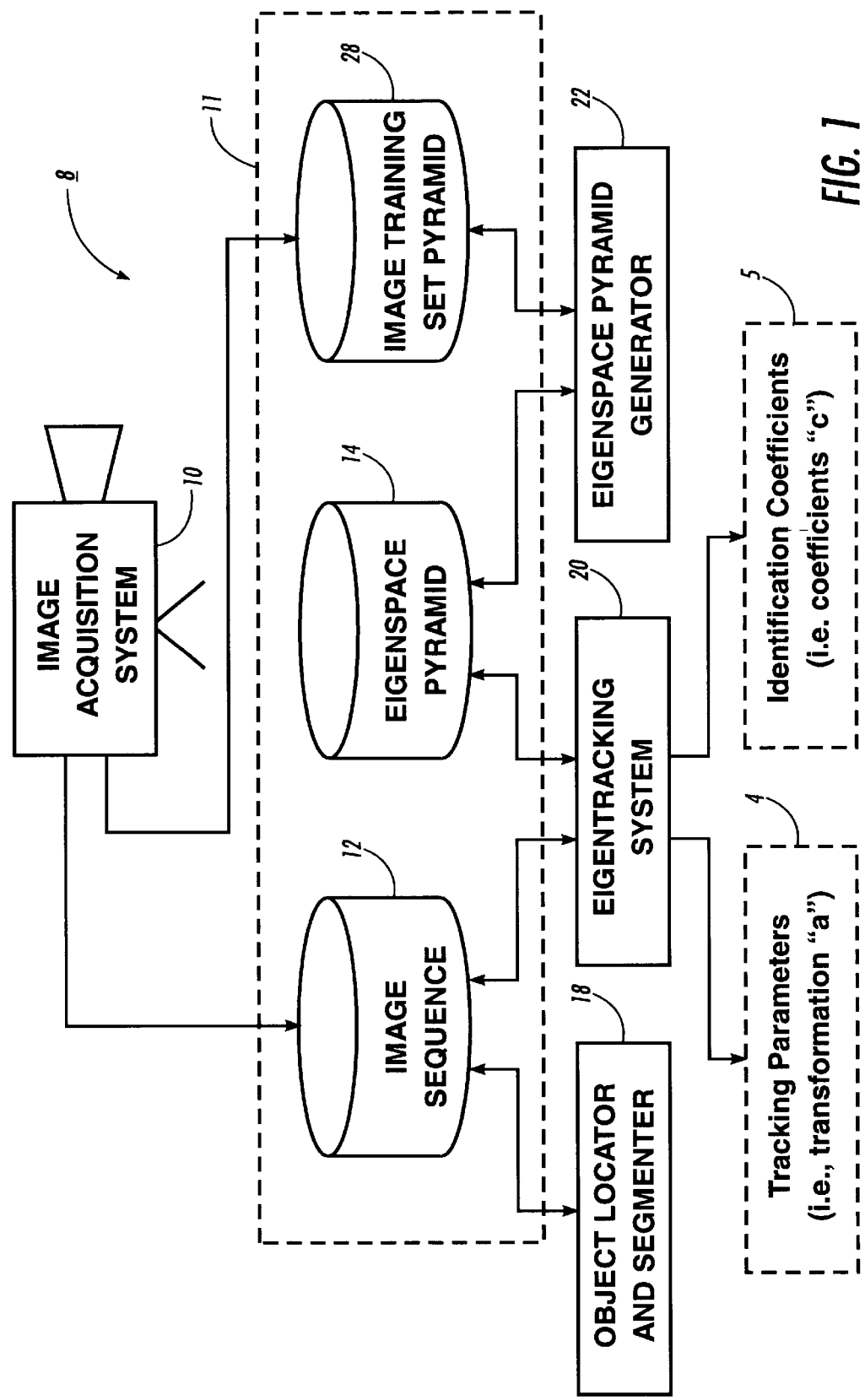
FIG. 1 illustrates a general block diagram of a system incorporating the present invention.

Referring now to the drawings where the showings are for the purpose of describing the preferred embodiment of the invention and not for limiting same, FIG. 1 illustrates a general block diagram of a system 8 for recognizing and tracking an object using view-based representations of the object. These view-based representations focus on an object's appearance rather than its shape or structure. Generally, the system 8 includes an image acquisition system 10 which records images in a memory 11. The recorded images define part of an image training set pyramid 28 or an image sequence 12. Initially, images defining the image training set pyramid 28 are processed by an eigenspace pyramid generator 22 to generate and store in the memory 11 an eigenspace pyramid 14. Subsequently, the first frame of the image sequence 12 is processed by an object locator and segmenter 18 for later processing by eigentracking system 20. The eigentracking system 20 tracks and identifies appearance changes in the object through the sequence of images 12.

The eigenspace pyramid 14 which is generated from the image training set pyramid 28 provides a set of basis images that are used by the eigentracking system 20 to identify and track an object recorded in the image sequence 12. Advantageously, the eigentracking system 14 not only tracks the motion of an object as it moves through the image sequence 12 but is also identifies changes in viewpoint. That is, the eigentracking system 14 tracks both rigid and articulated motion of an object as it moves through the image sequence 12.

More specifically, the eigentracking system 20 generates tracking parameters 4 and identification coefficients 5 for each frame in the recorded image sequence 12. The tracking parameters 4, which are recorded in a transformation "a", are used to track the movement of the object between frames in the image sequence 12. Identification coefficients 5 (i.e., coefficients "c") are used to recognize changes of view in the object being tracked through the sequence of images 12. A change of view can either involve deformation changes or appearance changes of the object being tracked. Deformation changes involve changes in physical shape of the object.

Appearance changes involve changes in orientation or resolution of the object.

B. Constructing an Eigenspace Pyramid

Figure 2:
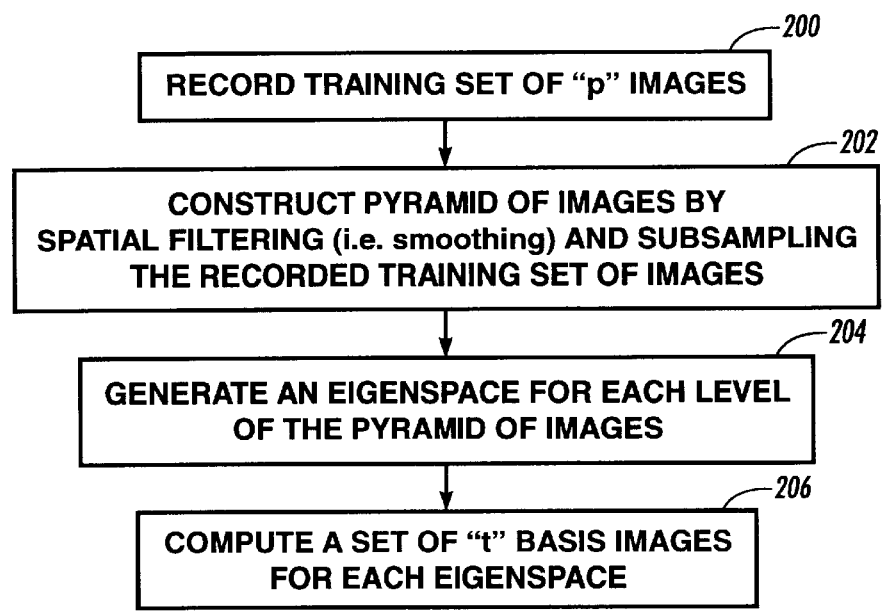
FIG. 2 is a flow diagram detailing the steps for building an eigenspace pyramid.
Figure 3:
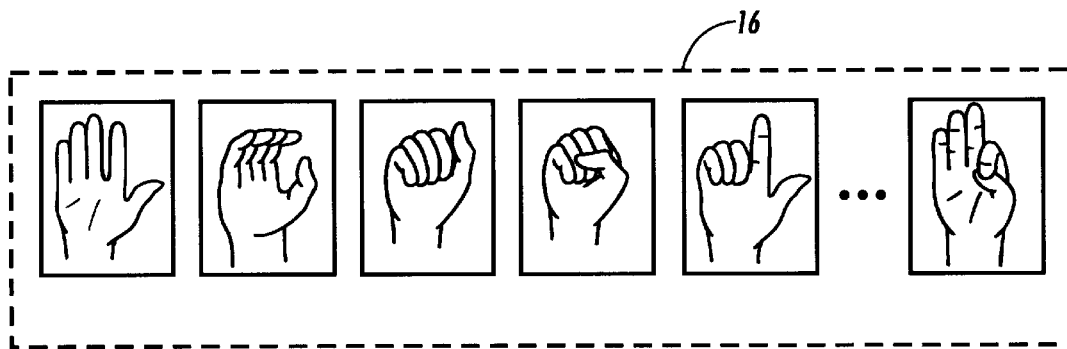
FIGS. 3 and 4 illustrate two training sets that are each made up of "p" images.
Figure 4:
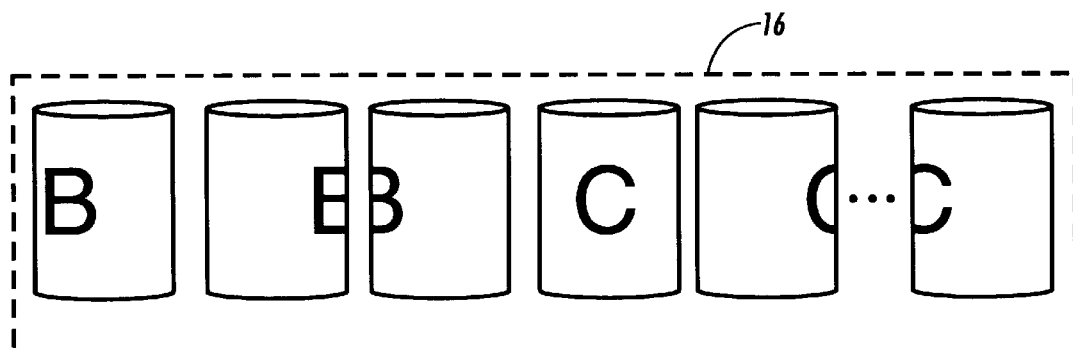

FIG. 2 is a flow diagram detailing the steps performed by the eigenspace pyramid generator 22 for generating an eigenspace pyramid 14. Initially at step 200, a training set of images 16, two examples of which are shown in FIGS. 3 and 4, is recorded using the image acquisition system 10. FIGS. 3 and 4 illustrate two different training sets 16 that are each made up of "p" images. In accordance with the invention, the "p" images in each training set represent views from a limited number of orientations. The system 8 recognizes other orientations by recovering a parameterized transformation 4 between an image in the image sequence 12 and an eigenspace in the eigenpyramid 14, the details of which are described below.

The training sets 16 shown in FIGS. 3 and 4 illustrate two different aspects of the invention. The "p" images of training set 16 shown in FIG. 3 illustrate a number of different hand gestures. This training set illustrates a training set that can be used to recognize an object that is deforming through a sequence of images. The alternate training set 16 shown in FIG. 4 is composed of "p" images of identical cylindrical cans. Each can in the training set has either the letter "B" or the letter "C" inscribed thereon. Each of the "p" images of the training set represents either the "B" can or the "C" can at different orientations. The training set 16 illustrates a training set that can be used to recognize an object with an identity that changes between image frames (e.g. from "B" to "C") but does not change in shape.

Figure 5:
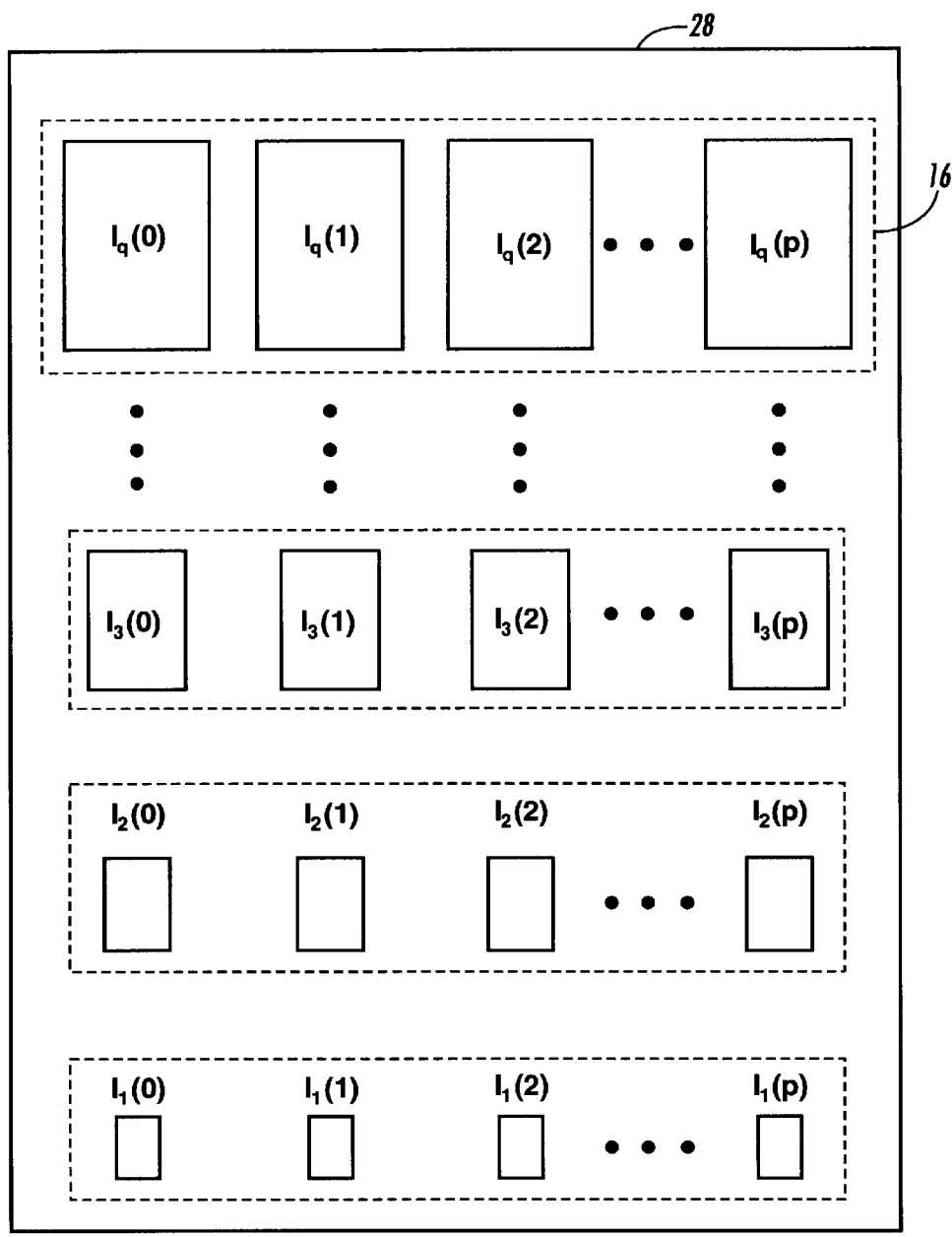
FIG. 5 illustrates a pyramid of training set images where each of the pyramids is a different level of resolution.
Figure 6:
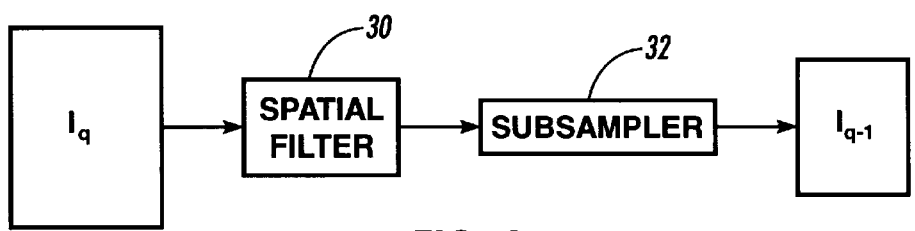
FIG. 6 illustrates a spatial filter and subsampler for generating the multi-scale training set of images shown in FIG. 5.

At step 202 shown in FIG. 2, the pyramid of training set images 28 is generated using the training set of images 16 recorded using the image acquisition system 10. FIG. 5 illustrates an example of a pyramid of training set images 28 that originates from a training set of "p" images. The pyramid of training set images 28 has "q" decreasing levels of resolution. FIG. 6 illustrates a spatial filter 30 and a subsampler 32 for scaling the images in the training set 16 to each level of the pyramid 28. Each image of the training set of images 16 is initially smoothed using spatial filter 30 and subsequently subsampled using subsampler 32 until "q" levels of images are generated. Specifically, FIG. 6 shows an image "I" that is reduced to from a fine scale or level "q" to a coarser scale or level "q−1". This process of scaling images from a fine scale to a coarse scale is repeated for each level of the pyramid of images 28.

At step 204 shown in FIG. 2, an "eigenspace" is generated for each level of the pyramid of training set images 28. An eigenspace is generated by deriving a principal set of components from a set of input images such as the training set of images 16. The resulting principal set of components, which identify characteristic features of images in the training set, are derived by computing eigenvectors of the training set. In general, eigenvectors define a compact approximate encoding or "view-based representation" of the training set in terms of a small number of orthogonal basis images. These orthogonal basis images characterize the majority of variations in the training set by spanning a subspace of the training set called the eigenspace. The images defining the eigenspace have the property of being orthogonal to each other. Once an eigenspace is defined for a training set of images, a linear combination of the basis images defining the eigenspace can be used to approximately reconstruct any of the images in the training set. At step 206, a sub-set of "t" basis images is computed for each eigenspace of "p" images generated at step 204, where "T" is an integer much less than "p". Each sub-set of "t" basis images computed for each eigenspace accounts for most of the variance between the images in the training set 16.

Figure 7:
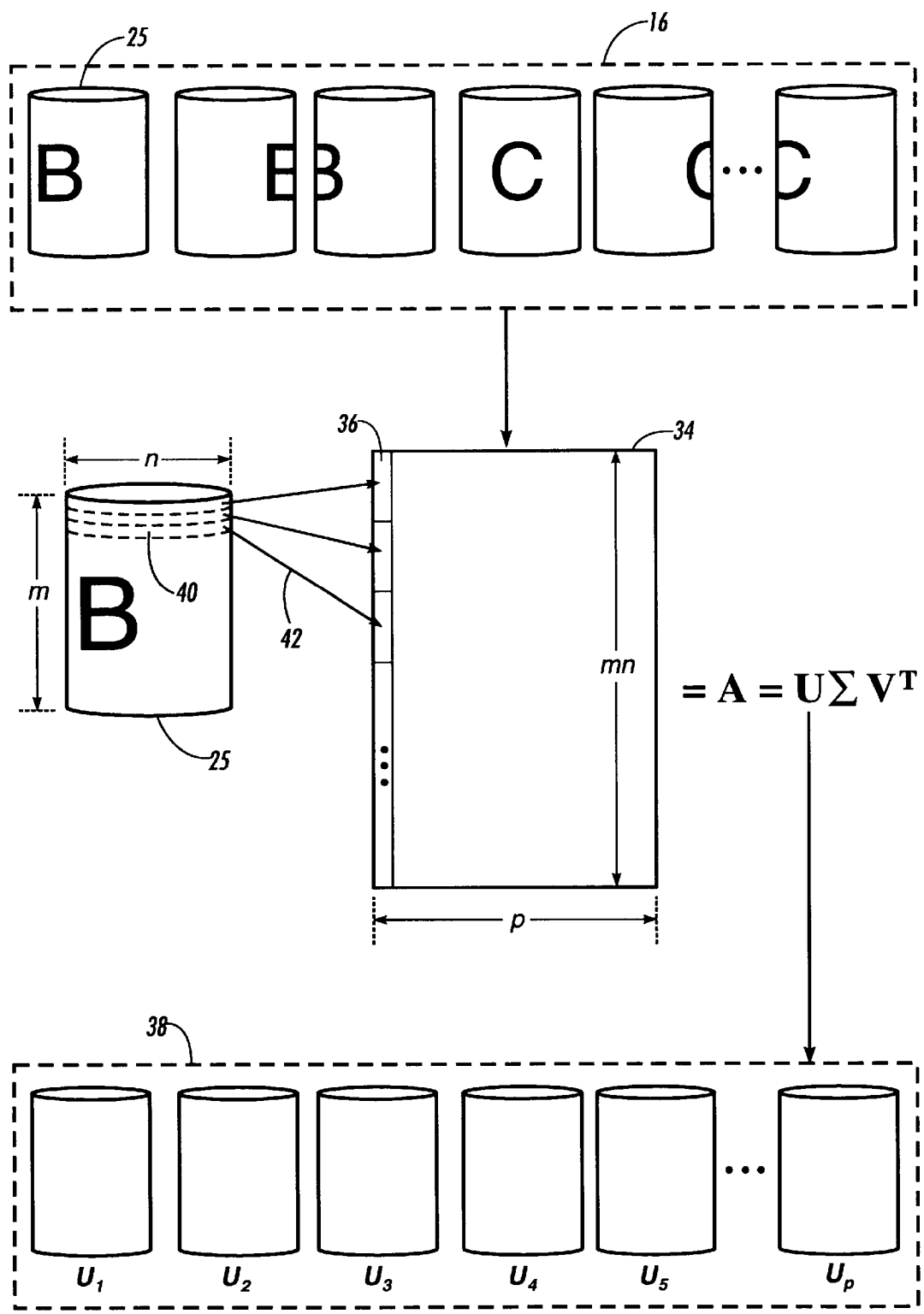
FIG. 7 illustrates a method for generating an eigenspace from a training set of images.

FIG. 7 illustrates a method for computing an eigenspace 38 from the training set 16 having "p" images. Each of the "p" images in the training set 16 is an n×m image, where p<n*m. Initially, each image in the training set 16 is converted to a one dimensional column vector by scanning each of the p images in standard lexicographical order to form an (nm×p) matrix A, which is indicated generally by reference number 34. For example, n×m image 25 in the training set 16, is converted into a column vector 36 by scanning each of its m rows from left to right. For instance, row 40 of image 25 is positioned as indicated by arrow 42 in the column vector 36 of the matrix A (indicated by reference number 34).

Assuming the number images is less than the number of pixels of each image (i.e., p<nm) of the training set 16, Singular Value Decomposition (SVD) can be used to decompose the matrix A as:

$$A = U \Sigma V^T,$$

where the matrix U is an orthogonal matrix of the same size as the matrix A, which is indicated generally by reference number 38. A method for performing SVD is set forth in detail by Press et al. in "Numerical Recipes in C", Cambridge University Press, 1992 (ISBN 0 521 43108 5), pp. 59–70, the disclosure of which is incorporated herein by reference. The resulting matrix U (indicated by reference number 38) is defined by a set of eigenvectors (i.e., $U_1$, $U_2$, $U_3$, ... $U_p$) of the training set of images 16. Each column of matrix U, therefore, represents the principal component directions of the p images in the training set of images 16. The matrix $\Sigma$ is a diagonal matrix of singular values $\sigma_1$, $\sigma_2$, ..., $\sigma_p$ which are also known as "eigenvalues". The eigenvalues are sorted along the diagonal in decreasing order of size. Eigenvalues with the greatest size account for the largest amount of variance between the images in the training set 16. The matrix $V^T$ is a p×p orthogonal matrix that encodes the coefficients to be used in expanding each column of the matrix U in terms of the principal component directions.

C. Matching an Image with the Eigenspace

Once the eigenspace 38 shown in FIG. 7 is generated, it can be used to approximate the different views of the images recorded in the training set 16. These different view are approximated by adding together a linear combination of the basis vectors of the eigenspace 38. In addition, the eigenspace 38 can be used to approximate images that are not recorded in the training set by matching an image with the eigenspace as set forth below.

C.1 Matching an Image in the Training Set with the Eigenspace

An image in a training set of images can be reconstructed using a sub-set of "t" principal component or basis images from the matrix U set forth above. The sub-set of "t" principal component images can be represented as $U_1$, $U_2$, $U_3$, ... $U_t$, where "t" is an integer much less than "p" (i.e., the number of basis image in the eigenspace). This reconstruction of an image in the training set 16 is a projection of the image onto the sub-set of "t" basis vectors. In general, since the columns of the matrix U are orthogonal, an arbitrary column $A_j$ of the matrix A can be represented as a linear combination of columns of the matrix U. Furthermore, if the eigenvalues $\sigma_k$, for $k \geq t$ for some t are small, then some column e of the matrix A can be approximated as e*=Uc as follows:

$$e^* = Uc = \sum_{i=1}^{t} c_i U_i,$$

where $U = [U_1, U_2, \ldots U_t]$, $c = [c_1, c_2, \ldots c_t]^T$.

The resulting approximated image (i.e., e*) is an input image written as an (nm×1) vector, and the coefficients $c_i$ are scalar values that are computed by taking the dot product of e (i.e., some column of matrix A) and the column eigenvector $U_i$ (i.e., $c_i = U_i^T \cdot e$). This operation essentially performs a "matching" between an eigenspace and an image.

C.2 Matching an Image Outside the Training Set with the Eigenspace Using a Robust Formulation Besides reconstructing an image in the training set of an eigenspace, a linear combination of the principal component images can be used to reconstruct images which are not in the training set. It is known in the art that an image e (where e is an nm×1 vector) that is, not an image in the training set of the eigenspace can be approximated by the image e*, which is determined by computing the least squares estimate of the coefficients $c_i$ (i.e., $c_i = U_i^T \cdot e$). Least squares estimation is described in detail by Strang, in "Linear Algebra and its Applications", Academic Press, New York, 1976. In least squares estimation, the coefficients $c_i$ that are used to construct the approximate image e* of the input image e are selected so that the squared error E(c) between e* and e is minimized. The squared error E(c) is given by the following equation:

$$E(c) = \sum_{j=1}^{n \times m} (e_j - e_j^*)^2 = \sum_{j=1}^{n \times m} \left( e_j - \left( \sum_{i=1}^{t} c_i U_{i,j} \right) \right)^2. \quad (1)$$

The least squared method for approximating an image e not in the eigenspace works well when the input image has objects that are clearly segmented so that they look similar to those used in building the eigenspace. However, it is known that the least squares approach is sensitive to gross errors or "outliers". In particular, an image that contains structured noise (e.g. from the background of the image) and can be represented by an eigenspace, may generate multiple matches between the input image and the eigenspace. Input images with multiple matches generate images with different views (i.e., change in structure). When there is structured noise in the original image e, the least squares solution approximates the image e* by selecting a combination of views that may produce a blurry or noisy reconstruction of the original image e.

In accordance with the present invention, an original input image e that does not form part of an image in the training set of images is approximated by the image e* using a robust formulation that recovers dominant features of the image e while not being sensitive to gross errors or "outliers". In order to better match the input image with the eigenspace, the quadratic error norm in equation (1) is replaced with robust error norm $\rho$. To robustly estimate the coefficients $C_i$ (i.e., $c_i = U_i^T \cdot e$), the following objective function is minimized:

$$E(c) = \sum_{j=1}^{n \times m} \rho \left( \left( e_j - \left( \sum_{i=1}^{t} c_i U_{i,j} \right) \right), \sigma \right), \quad (2)$$

where $\sigma$ is a scale parameter. In one embodiment, the error norm, $\sigma$, and the derivative of the error norm, $\psi$, are defined as:

$$\rho(x, \sigma) = \frac{x^2}{\sigma^2 + x^2}, \text{ and}$$

$$\frac{\partial}{\partial x} \rho(x, \sigma) = \psi(x, \sigma) = \frac{2x\sigma^2}{(\sigma^2 + x^2)^2}, \text{ respectively.}$$

The error norm defined for $\rho$ and the derivative of the error norm defined for $\psi$ have been used extensively in optical flow estimation as disclosed for example by Black et al., in "The Robust Estimation Of Multiple Motions: Affine And Piecewise-Smooth Flow Fields," Technical Report P93-00104, Xerox PARC, December 1993, and by Black et al. in "A Framework For The Robust Estimation Of Optical Flow," Proc. Int. Conf. on Computer Vision, ICCV-93, pages 231–236, Berlin, Germany, May 1993. As shown in these references, the shape of the function of the error norm defined above tends to reject or down weight large residual errors. As described by Hampel et al. in "Robust Statistics: The Approach Based on Influence Functions," John Wiley and Sons, New York, N.Y., 1986, the derivative of the error norm $\rho$ (i.e., otherwise known as influence function $\psi$) defined above characterizes the influence of large residual errors. The influence function operates so that as the magnitude of residual errors (i.e., $|e_j - e_j^*|$) grows beyond a point their influence on the solution to estimating the coefficients, $c_i$, decreases and the value of the error norm $\rho(\cdot)$ approaches a constant.

The value of the scale parameter a affects the point at which the influence of outliers begins to decrease. By examining the influence function $\psi$, the outlier rejection can be seen to begin where the second derivative of the error norm $\rho$ is zero. Thus, for the error norm $\rho$ defined above, residual errors have reduced influence on the solution to estimating the coefficients, $c_i$, and can be viewed as outliers where:

$$|(e_j - e_j^*)| > \sigma / \sqrt{3}.$$

Computation of the coefficients, $c_i$, is performed by minimizing the non-linear function of equation (2). This minimization is performed using a simple gradient descent scheme with a continuation method that begins with a high value for $\sigma$ and lowers the value of $\sigma$ during the minimization process. The effect of minimizing the non-linear function with this method is not to initially reject data as outliers but instead reduce the influence of outliers gradually.

Figure 8:
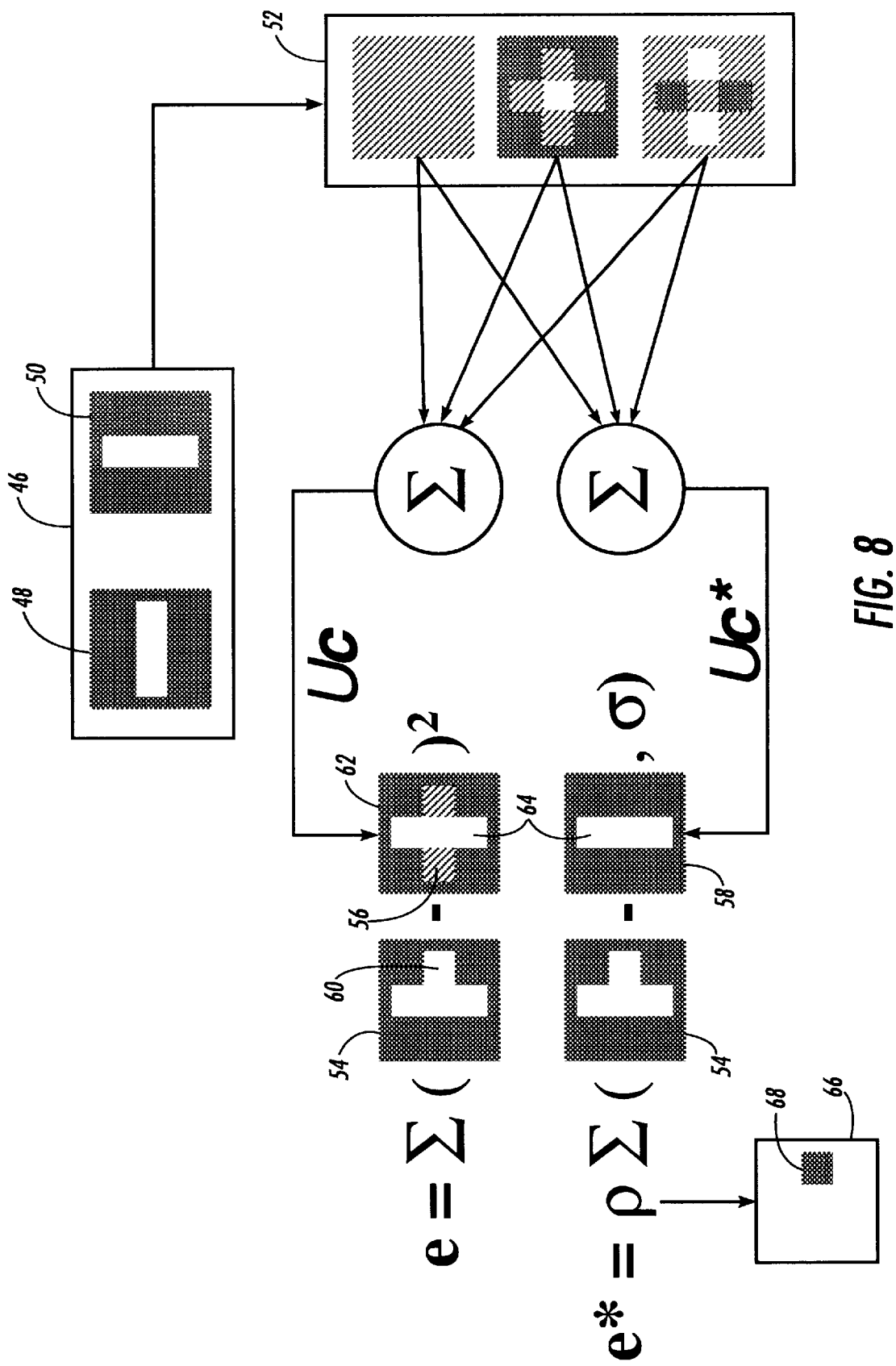
FIG. 8 illustrates the advantage of matching an input image using a robust formulation instead of a least squares formulation.

C.3 Comparative Matching Example between Robust Formulation and Least Squares FIG. 8 illustrates the advantage of matching an input image 54 (i.e., e) with an eigenspace 52 of a training set 46 of images using the robust formulation set forth in equation (2) (indicated generally by e*) instead of the least squares method set forth in equation (1) (indicated generally by e). As shown in FIG. 8, the input image 54 is not in the training set of images 46 and does not appear to be similar to either image in the training set. The training set 46 includes images 48 and 50. The resulting output image of the least squares reconstruction of the input image 54 is indicated by reference number 62. Reconstructed image 62 illustrates that the least squares method of reconstruction attempts to account for all the data in the original input image 54. Specifically, the original horizontal bar 60 is partially recovered while recovering an additional left portion of horizontal bar 56. In other words, the reconstructed image 62 shows that the least squares method is unable to fully account for vertical bar 64 using a linear combination of the basis images 52 without recovering unwanted portions of the horizontal bar 56.

In contrast, the resulting output image of the robust reconstruction of the input image 54 is indicated by reference number 58. Using the robust formulation of equation (2), the reconstructed image 58 recovers the dominant features between the input image 54 and the training set 46 as indicated by the presence of only vertical bar 64. The portion of the horizontal bar 68 not in the approximated image 58 is treated as an outlier as shown in image 66. In effect, the least squares reconstruction of the input image 54 recovers a single view that contains elements of both possible training set views. The robust reconstruction, on the other hand, recovers a more accurate reconstruction by recovering the dominant view of the training set 46. Furthermore, because the robust reconstruction method treats the points in the input image 54 that did not match the robust reconstructed image 58 very well as outliers 68, these outliers 68 can be used to recover another view (i.e., multiple matches) from the training set that best matches them, as described below.

C.4 Multiple Matches between an Image and an Eigenspace when the Image is not Well Represented by the Training Set of the Eigenspace The input image 54 shown in FIG. 8 is an example of an image that is not well represented by any single image in the training set 46. In other words, the training set 46 does not contain a brightness pattern that can accurately represent the input image 54. Given that the robust match 58 recovers the "dominant" structure in the input image 54, points 68 that were treated as outliers can be detected. An outlier vector, or mask $m_j$, is defined herein to be:

$$m_j = \begin{cases} 0 & |(e_j - e_j^*)| \leq \left(\frac{\sigma}{\sqrt{3}}\right) \\ 1 & \text{otherwise} \end{cases}$$

In the event a robust match results in a significant number of outliers, then the additional matches can be found by minimizing the following equation:

$$E(c) = \sum_{j=1}^{n \times m} m_j \rho\left(\left(e_j - \left(\sum_{i=1}^{t} c_i U_{i,j}\right)\right), \sigma\right).$$

For example, the image 66 shown in FIG. 8 that indicates outliers of input image 54 would provide another matching image from the eigenspace 52 (such as input image 48). In an alternate embodiment, a mixture-model formulation could be adopted to recover multiple sets of coefficients $c_i$ simultaneously. Examples of mixture-model formulation are disclosed by: Jepson et al. entitled "Mixture Models For Optical Flow Computation", in "Partitioning Data Sets: With Applications to Psychology, Vision and Target Tracking", pages 271–286, DIMACS Workshop, April 1993, AMS Pub., Providence, R.I.; McLachlan et al., in "Mixture Models: Interference and Applications to Clustering", Marcel Dekker Inc., N.Y., 1988; and Saund in "A Multiple Cause Mixture Model For Unsupervised Learning," Neural Computation, Vol. 7, pp. 51–71, 1995.

D. Tracking an Object Undergoing Changes in Position and/or Structure through a Sequence of Images Since it is impracticable to represent all possible views of an object at all possible scales and orientations in the training set 16, images in the sequence of images 12 must be aligned with the eigenspace 38 in order to formulate a match between an image in the sequence of images and the eigenspace. An image that is aligned with the eigenspace 38 has a similar orientation and scale as the images forming the training set 16 of the eigenspace 38. For example, images of cans that are used to define the training set 16 shown in FIG. 4 are oriented so that each can is upright at a similar scale. In accordance with the present invention, alignment between an input image and an eigenspace is performed by simultaneously computing a transformation to align the input image with the eigenspace while matching the input image with the eigenspace as discussed above. Advantageously, the present invention uses a small set of predetermined views and hence a small eigenspace (i.e., a small number of basis vectors). By providing a parameterized transformation between an input image and an eigenspace, the small set of views can be used when matching the input image with the eigenspace.

D.1 Recovering a Parameterized Transformation u (x,a) between the Image Region I(x) and the Eigenspace Simultaneous matching and alignment is performed by extending the non-linear parameter estimation techniques described above for computing matching coefficients $c_i$ to include transformation parameters u(x,a). To extend eigenspace methods to allow matching under some parametric transformation a notion of "brightness constancy" between an eigenspace and an input image must be formalized. This formalization is a generalization of the notion of a brightness constancy assumption used in optical flow. The brightness constancy assumption states that the brightness of a pixel remains constant between frames but that its location may change. For eigenspaces the notion of brightness constancy is extended herein to a "subspace constancy assumption" that states that there is a view of an object in a reconstructed image, as represented by some linear combination of basis vectors of an eigenspace, such that the pixels in the reconstructed image are the same brightness as the pixels in an input image given an appropriate transformation. In alternate embodiments this notion of brightness constancy between an input image and an eigenspace can be expanded to include filtered images. For example, filtered images can include images that were filtered to reduce noise or to enhance edges.

In accordance with the invention, let I be an n×m input image and let $$Uc = \sum_{i=1}^{t} c_i U_i,$$

-continued where $U = [U_1, U_2, \ldots U_t]$, $c = [c_1, c_2, \ldots c_t]^T$, and Uc is the approximated image for a particular set of coefficients $c_i$. Even though Uc is an (nm×1) vector, Uc can be indexed as though it were an n×m image. Accordingly, [Uc](x) is defined herein to be the value of Uc at the position associated with a pixel location x=(x,y). Robust matching objective function (2) can then be expressed as follows:

$$E(c) = \sum_x \rho(I(x) - [Uc](x), \sigma).$$

Similar to the brightness constancy assumption of parameterized optical flow estimation, the subspace constancy assumption is defined herein by parameterizing the input image I as follows:

$$I(x+u(x, a)) = [Uc](x), \forall x, \quad (3)$$

where x=[x,y] and u(x,a)=(u(x,a), v(x,a)), and where u(x,a) represents an image transformation (or motion) where u and v represent the horizontal and vertical displacements at a pixel of the input image I and the parameters a are estimated. For example, the image transformation u(x,a) may be defined as the affine transformation where:

$$u(x,a) = a_0 + a_1 x + a_2 y, \text{ and } v(x,a) = a_3 + a_4 x + a_5 y.$$

Briefly, $I_x$ and $I_y$ are partial derivatives of the image I(x). Individually, the parameters $a_0$ and $a_3$ represent horizontal and vertical translation, respectively. In addition, the combination of parameters $a_1 + a_5$ are used to represent divergence (isotropic expansion); parameters $a_1 - a_5$ are used to represent deformation (squashing or stretching); and parameters $a_4 - a_2$ are used to represent image-curl (rotation about the viewing direction).

More specifically, the equation (3) defining the subspace constancy assumption states that there should exist a transformation u(x,a), that, when applied to an image region I(x), makes the image region I(x) look like some image reconstructed using an eigenspace. That is, the transformation u(x,a) "warps" the input image into the coordinate frame of the eigenspace (i.e., training data).

In accordance with the subspace constancy assumption, for some transformation a and some set of coefficients c the brightness values of the input image, I(x+u(x,a)), are the same as those of the image e*=Uc reconstructed using eigenspace 38. To simultaneously recognize an object's change in view and the object's change in structure through a sequence of images, the coefficients c and transformation a must be found that minimizes the following objective function:

$$E(c, a) = \sum_x \rho(I(x + u(x, a)) - [Uc](x), \sigma). \quad (4)$$

The details of minimizing the objective function E(c,a) with respect to the coefficients c and the parameters a are set forth in the Appendix.

In general, minimization of the objective function E(c,a) is broken down into two sub-problems. A first sub-problem is to minimize the objective function E(c,a) with respect to c while the tracking (or warp) parameters, a, are held fixed. To do this the robust eigenspace matching formulation set forth in Section C.2 is applied with the image I(x) substituted for the image I(x+u(x+a)). The second sub-problem is to minimize E(c,a) with respect to tracking parameter, a, but now with the identification coefficients c held fixed. This calculation is performed by modifying a robust regression approach for optical flow disclosed in U.S. Pat. Nos. 5,802,220 and 5,774,591, the disclosures of which are incorporated herein by reference. This optical flow approach is based on the robust brightness constancy objective function:

$$E(a) = \sum_x \rho(I(x + u(x, a), t) - I(x, t+1), \sigma), \quad (5)$$

In equation (5) I(x,t) and I(x,t+1) are the images at times "t" and "t+1" while u(x,a) is the displacement map between frames of an image sequence. Equation (4) has the same form of expression as equation (5), except that the image frame at time "t+1" is replaced by an image Uc(x) approximated using an eigenspace.

Furthermore, the minimization of the objective function E(c,a) is performed using a simple gradient descent scheme with a continuation method that gradually lowers the value of σ. As better estimates of the transformation parameters a become available, the input image I(x) is warped by the transformation u(a) and this warped image is then used in the optimization. As iterative warping registers the input image I(x) and the eigenspace, the approximation of the reconstructed image Uc improves. This minimization and warping continues until the input image and the reconstructed image converge.

D.2 Framework of the Eigentracking System

In general, a coarse-to-fine strategy is used to recover the tracking parameters 4 when large pixel differences exist between an eigenspace 38 and an input image region. Once the multi-scale training set of images 28 is computed by smoothing and sub-sampling a training set of images 16, a unique eigenspace is computed for each resolution of images in the multi-scale training set 28. Subsequently, an input image is recorded in an image sequence 12, this input image is similarly smoothed and sub-sampled to provide a multi-scale set of input images. The coarsest level of the multi-scale set of input images is then matched against the coarsest level of the multi-scale eigenspace to compute the tracking parameters 4 and the identification coefficients 5. The intuition for applying a coarse-to-fine strategy is to minimize the physical distance between the basis images in the eigenspace 38 and the input image so that the low-frequency information in the coarser images dominates when matching the input image with the basis images in the eigenspace. The resulting values of the tracking parameters 4 and identification coefficients 5 are then projected to the next higher resolution level. These projected values of the tracking parameters 4 are then used to warp the input image towards the eigenspace 38 at the projected level and the values of the identification coefficients are further refined. This coarse-to-fine process continues to the finest resolution level thereby deriving a final set of tracking parameters 4 and identification coefficients 5.

Figure 9:
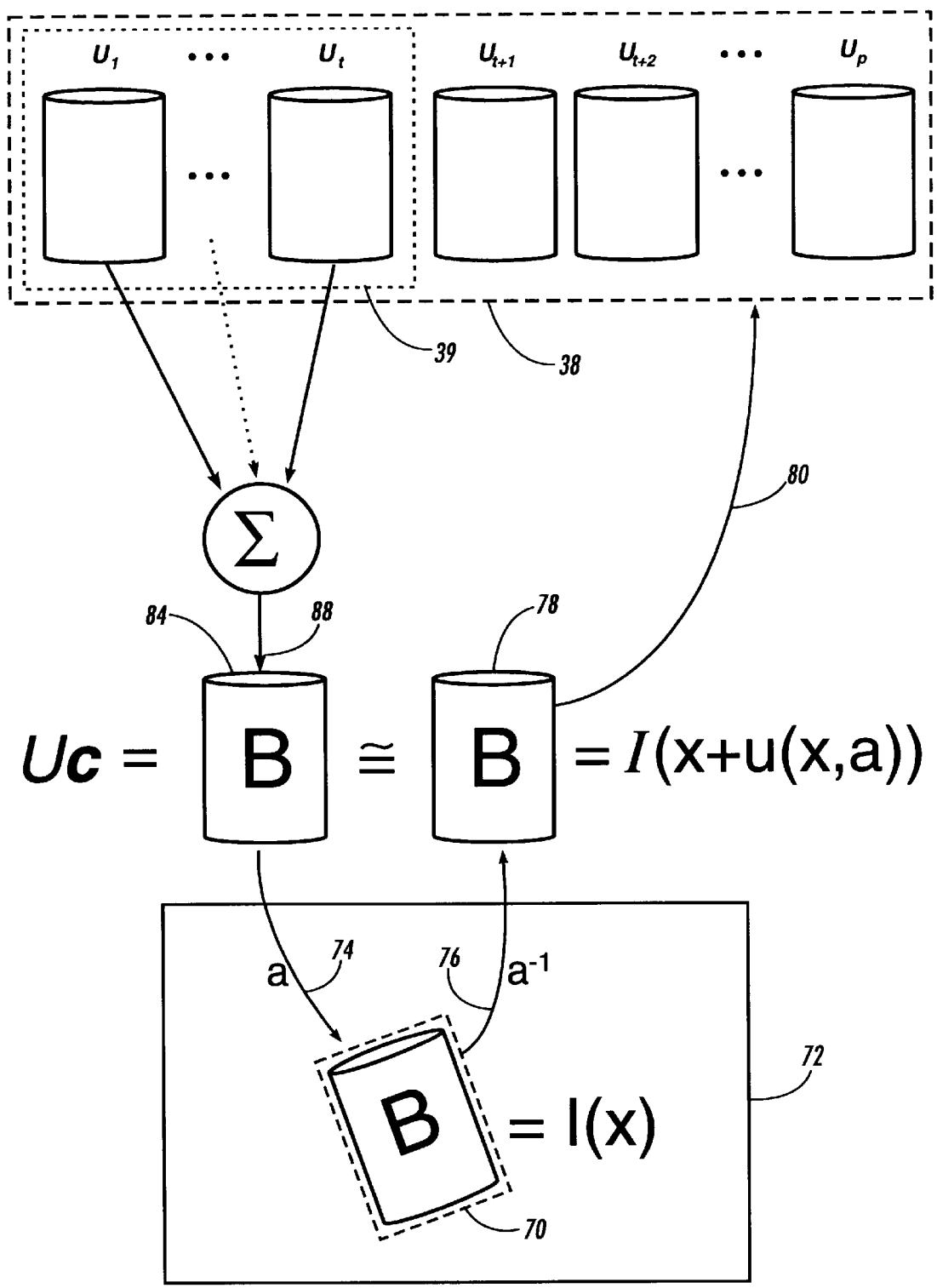
FIG. 9 illustrates operations performed by the eigentracking system shown in FIG. 1 when matching an image region I(x) that is not aligned with an eigenspace.

FIG. 9 illustrates operations performed by the eigentracking system 8 when matching an image region 1(x), indicated by reference number 70, that is not aligned with the eigenspace 38. In general, matching the image region 70 with the eigenspace 38 involves both estimating a view of the object (i.e., identification coefficients 5) and a transformation a that takes this view into the input image 72 containing the image region 70. Initially, the image region 70 is tracked in input image 72 using the transformation a as indicated by arrow 74. Second, the image region 70 is warped to align the object in the image region with the orientation of the object in the eigenspace 38, as indicated by arrow 76. Third, the resulting warped image region, indicated by reference number 78, is matched with the eigenspace 38, as indicated by arrow 80. As a result of matching the warped image region 78 with the eigenspace 38, a set of identification coefficients c is computed for a set of basis images $U_1$ to $U_t$, indicated generally by reference number 39, where "T" is an integer less than "p". Fourth, the input image is reconstructed using the identification coefficients c to define reconstruction image 84, as indicated by arrow 88. Finally, a transformation vector a is computed that represents the transformation between the reconstructed image 84 and the image region 70.

Figure 10:
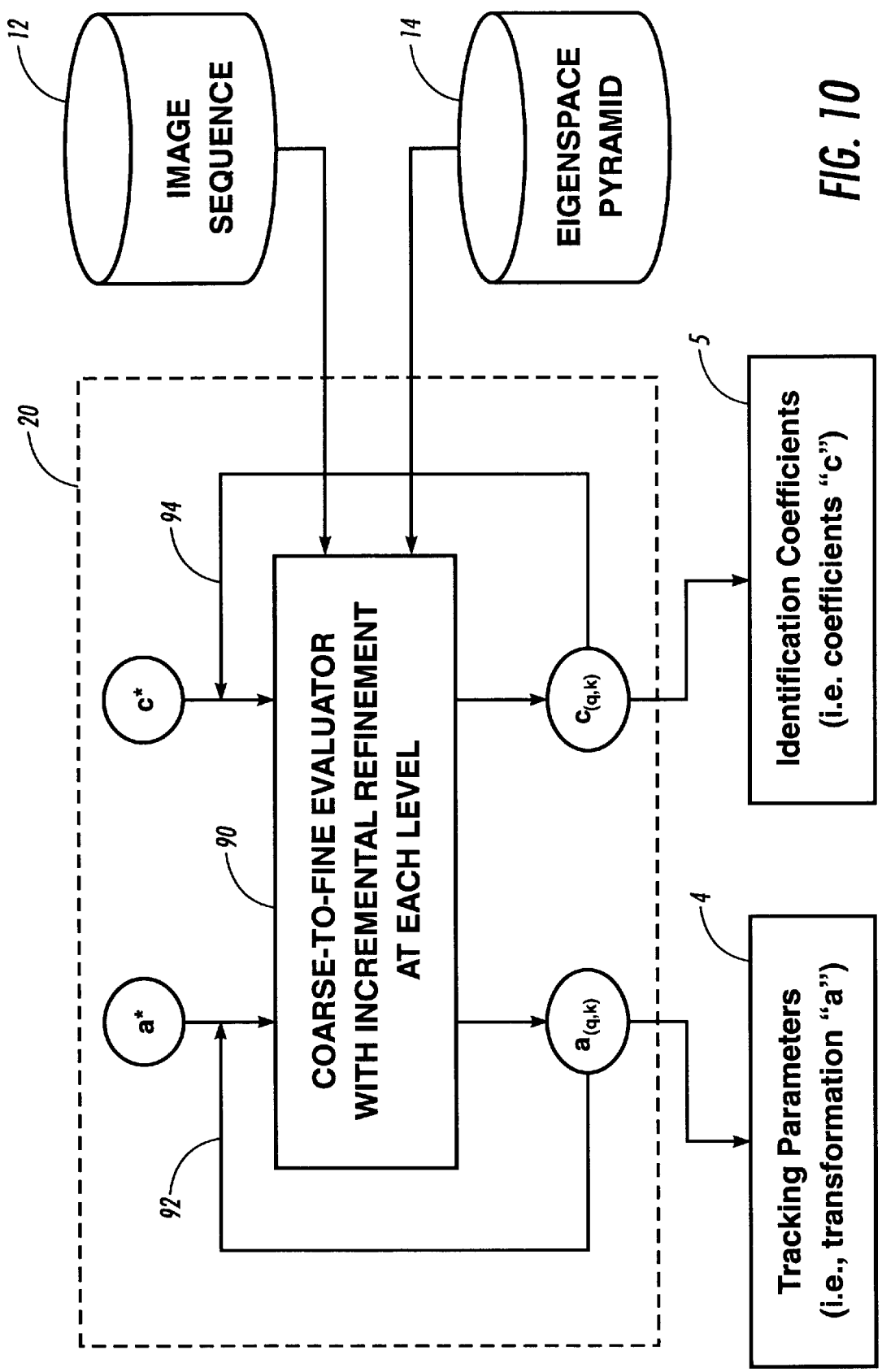
FIG. 10 illustrates an embodiment of the eigentracking system which recovers the tracking parameters and the identification coefficients for an image sequence.

FIG. 10 illustrates an embodiment of the eigentracking system 20 which recovers the tracking parameters 4 and the identification coefficients 5 for an image sequence 12. The eigentracking system shown in FIG. 10 can be used with a single image or with the sequence of images 12. In either case, tracking parameters 4 and identification coefficients 5 are computed by evaluator 90 using gradient decent with a continuation method. Large transformations between the eigenspace and an input image are accounted for by using the multi-scale eigenspace pyramid 14. Generally, the evaluator 90 has two parts. One part of the evaluator 90 performs coarse to fine evaluation of the input image I(j) at different levels of resolution. Another part of evaluator 90 supplements the coarse to fine evaluation with incremental refinement at each level of resolution. Estimates of tracking parameters a* and identification coefficients c*, which are computed from a previous frame in the image sequence 12, are initially input to the evaluator 90. Computation of tracking parameters and identification coefficients are repeated for "g" iterations as indicated by arrows 92 and 94, respectively. Once computed the tracking parameters are used to estimate the view of the object in the subsequent image in the image sequence 12, and the identification coefficients are evaluated to identify a particular view of the object in the image region. This provides the system 8 with a dual tracking and identification function. That is, the system 8 both tracks an object through a sequence of images and identifies changes in view as the object moves through the sequence of images.

Figure 11:
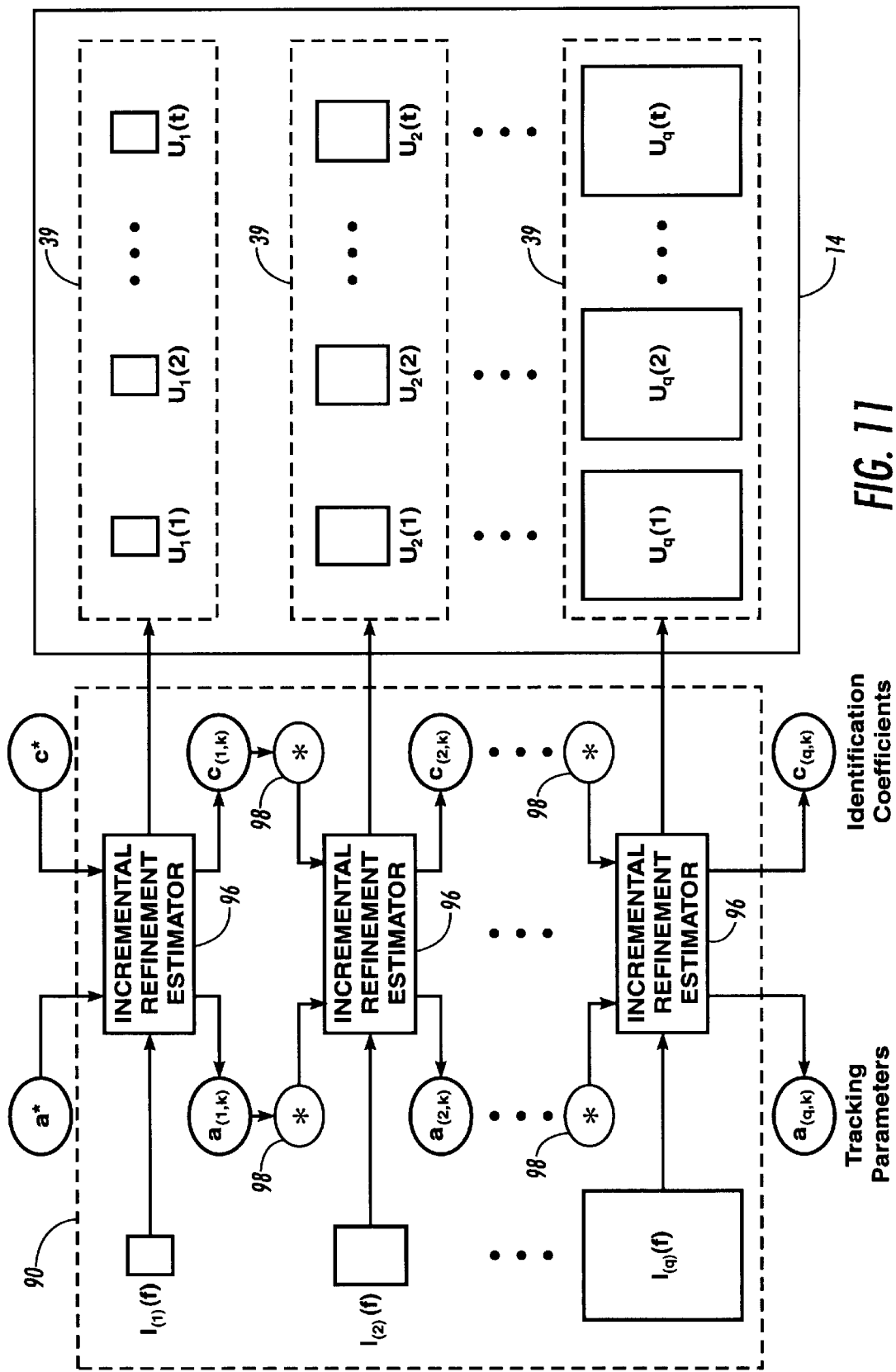
FIG. 11 illustrates the evaluator shown in FIG. 10 in greater detail.

FIG. 11 illustrates in greater detail the evaluator 90 shown in FIG. 10. More specifically, FIG. 11 illustrates the coarse-to-fine computation performed by eigentracking system 20 for determining tracking parameters 4 and identification coefficients 5 for an image region $I_{(q)}$ using the eigenspace pyramid or multi-scale eigenspace 14. The eigenspace pyramid has "q" levels, where each of the "q" levels is derived from a level of the pyramid of training set images 28. To match the "q" levels of the eigenspace pyramid, "q" increasingly coarse images are generated using the spatial filter 30 and the subsampler 32 which are shown in FIG. 6. Consistent with a coarse-to-fine strategy, tracking parameters $a_{(q,k)}$ and identification coefficients $C_{(q,k)}$ are refined at each of the "q" levels of the eigenspace pyramid 14. Furthermore, at each of the "q" levels, the values for a particular level "q" is computed using an incremental refinement estimator 96. Once computed by the estimator 96 tracking parameters 4 and identification coefficients 5 are projected to the next level using projection operators 98.

Figure 12:
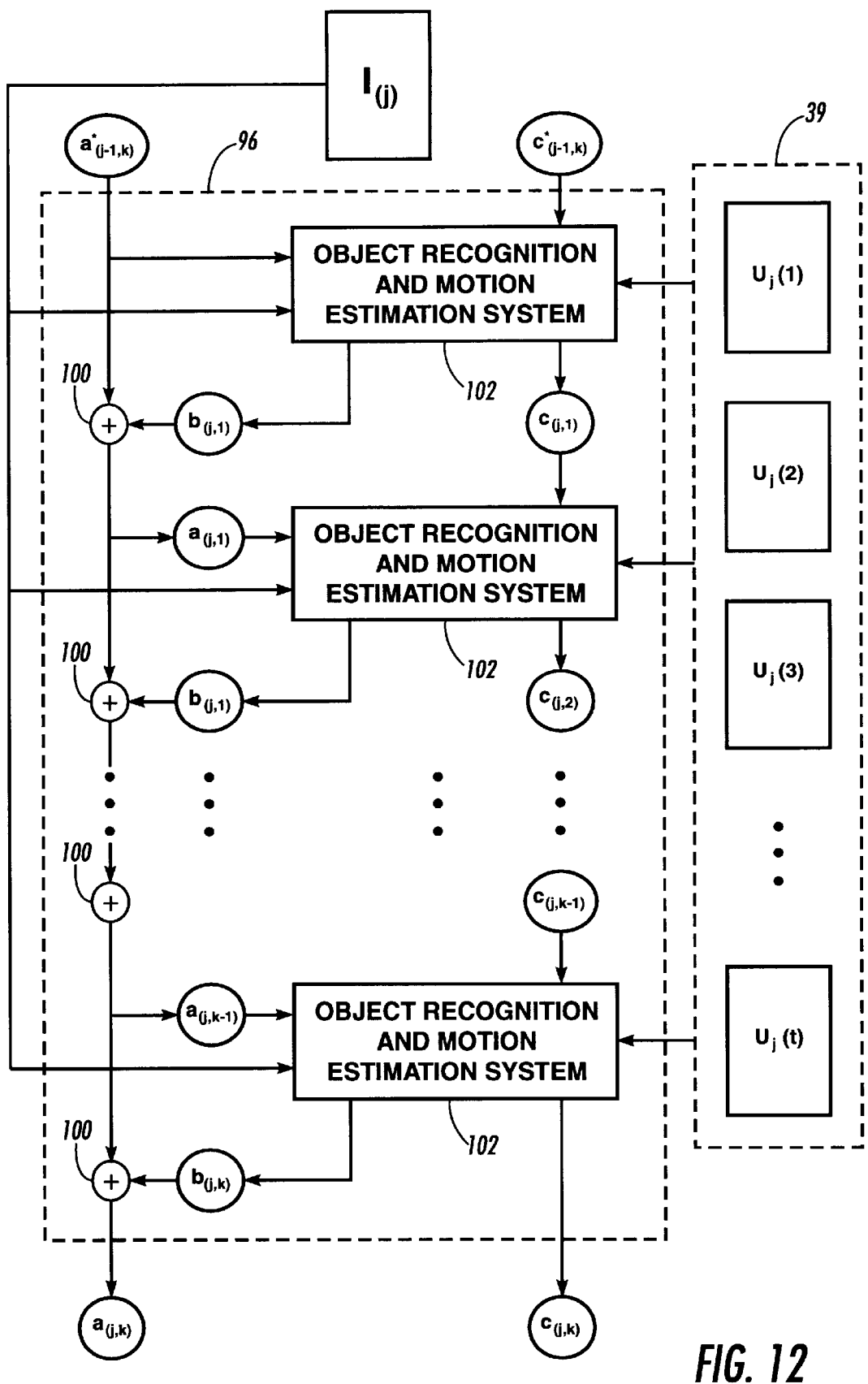
FIG. 12 illustrates in greater detail the incremental refinement estimator shown in FIG. 11.

FIG. 12 illustrates in greater detail the incremental refinement estimator 96 shown in FIG. 11. In each incremental refinement estimator 96, a series of object recognition and motion estimation systems 102 compute identification coefficients $c_{(j,i)}$ and tracking parameters $b_{(j,i)}$. As shown in FIG. 12, for each of the "k" levels of refinement, original estimates for the tracking parameters $a^*_{(j-1,k)}$ are composed (i.e., refined) using the tracking parameters $b_{(j,i)}$ computed at each of the "k" levels. In one embodiment, the composition of transformation $a_{(j,k)}$ is approximated using adders 96. Alternatively, composition can be performed as set forth in the Appendix. Also, original estimates for identification coefficients $c^*_{(j-1,k)}$ are updated each at each level to provide an improved match between the set of basis images 39 and the image region $I_{(j)}$.

Figure 13:
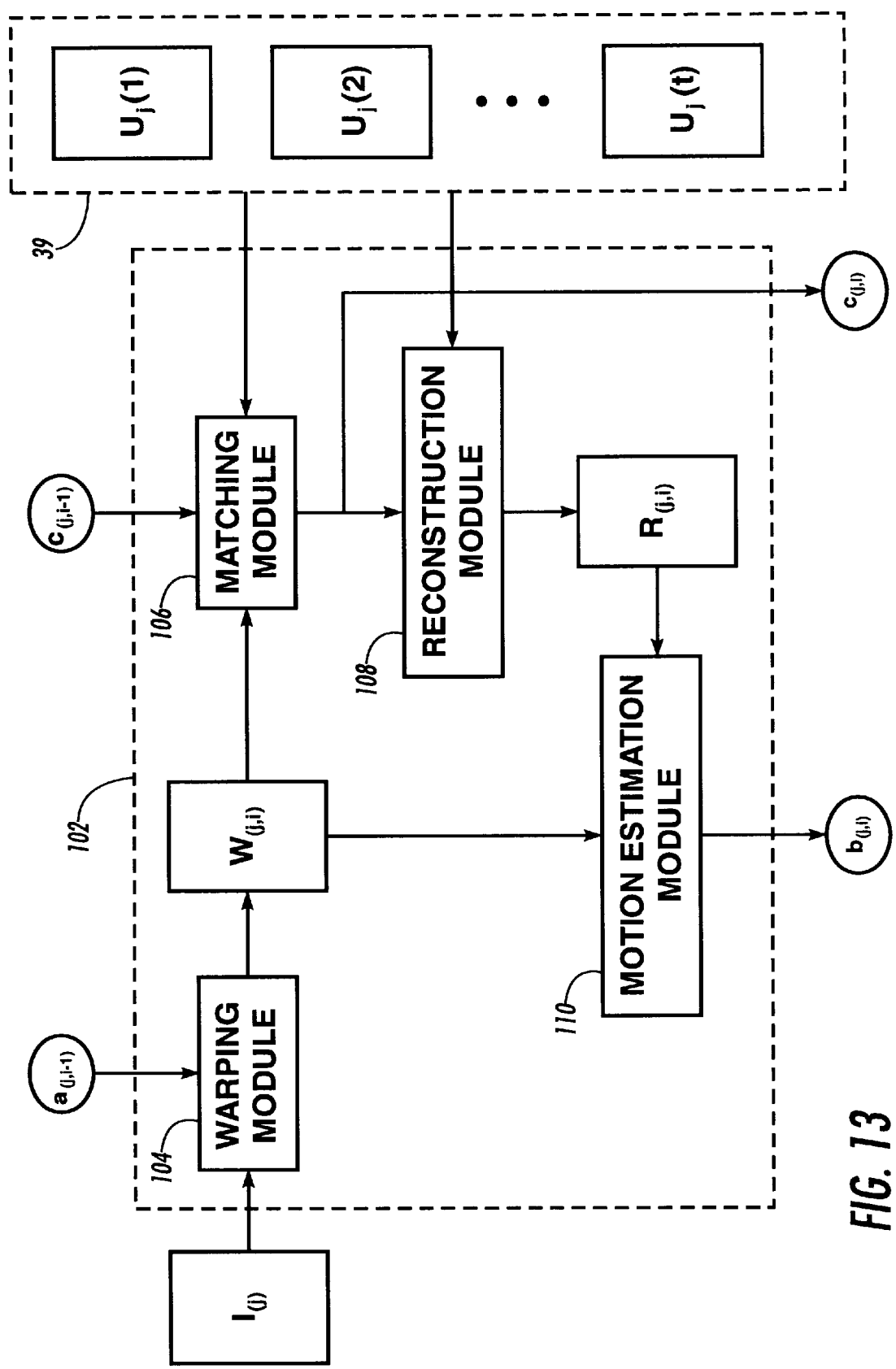
FIG. 13 illustrates in greater detail the object recognition and motion estimation system shown in FIG. 12.

FIG. 13 illustrates in greater detail the object recognition and motion estimation system 102 shown in FIG. 12 which aligns (i.e., warps) and matches a view of the object in the image region $I_{(q)}$ with a view of the object represented in the set of basis images 39. Forming part of system 102 are a warping module 104, a matching module 106, a reconstruction module 108, and a motion estimation module 110. The image region $I_{(q)}$ obtained from an image of the image sequence 12 and the tracking parameter estimate $a_{(j,i-1)}$ are input to the warping module 104 to generate a warped image $W_{(j,i)}$ that is aligned with views of objects in the set of basis images 39. The warped image $W_{(j,i)}$, the estimate of the identification coefficients $c_{(j,i-1)}$, and the set of basis images 39 are input to matching module 106 to compute identification coefficients $c_{(j,i)}$. These computed identification coefficients $c_{(j,i)}$ are used with a linear combination of basis images by reconstruction module 108 to approximate the warped image $W_{(j,i)}$ by a reconstructed image $R_{(j,i)}$. The warped image $W_{(j,i)}$ and the reconstructed image $R_{(j,i)}$ are input to the motion estimation module 110 which generates a set of tracking (or warp) parameters $b_{(j,i)}$ which defines the motion between the images.

D.3 Computational Flow of the Eigentracking System

Figure 14:
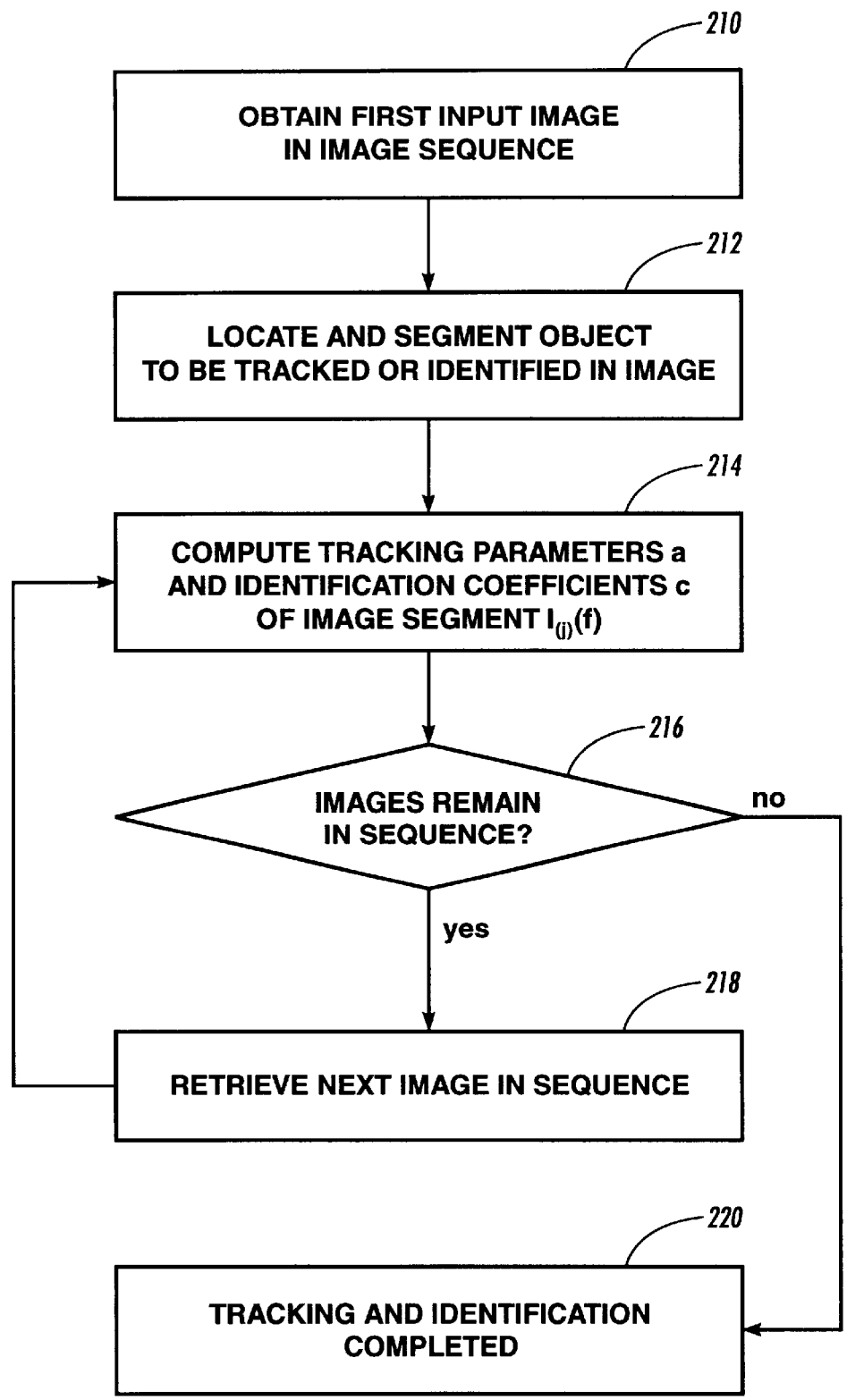
FIG. 14 is a general flow diagram of the steps performed by the eigentracking system when track ing an object through an image sequence.

FIG. 14 is a general flow diagram of the steps performed by the eigentracking system 20 when tracking an object through the image sequence 12. The image sequence is defined herein to be a sequence of images I(1), I(2) . . . I(f), where "f" is specifies the number of images in the image sequence 12. At step 210, the first input image in the image sequence 12 is retrieved from memory 11. The object to be tracked and/or identified is located in the first image and segmented at step 212. Methods for locating and segmenting an object in an image include thresholding and performing a global search (as disclosed by Turk et al. cited above). Once the object is located in an image region $I_{(j)}(f)$ at step 212, the object is tracked and identified at step 214. After computing tracking parameters 4 and the identification coefficients 5, the eigentracking system 20 determines whether any images remain in the image sequence 12 that have not been evaluated, at step 216. If images have not been evaluated in the image sequence 12 then step 218 is executed; otherwise, step 220 is executed. At step 218, the subsequent image in the image sequence 12 is retrieved from memory 11 and step 214 is repeated. If step 220 is executed the operation of eigentracking system 20 is terminated until a new image sequence 12 is recorded.

It will be understood by those skilled in the art that the eigentracking system 20 can operate for the purpose of recognizing objects alone. It is not necessary that an object be tracked through a sequence of images for the eigentracking system 20 to effectively identify an object in an image region. Similarly, the eigentracking system may operate so as to only track an object through a sequence of images without specifically identifying it. Furthermore, it will be understood by those skilled in the art that the eigenspace pyramid 14 used by the eigentracking system 20 to identify an image region will depend on the sequence of images being evaluated. However, if one or more eigenspace pyramids have been generated for a given object, the eigentracking system 20 may evaluate an image sequence against each of the eigenspaces in turn.

Figure 15:
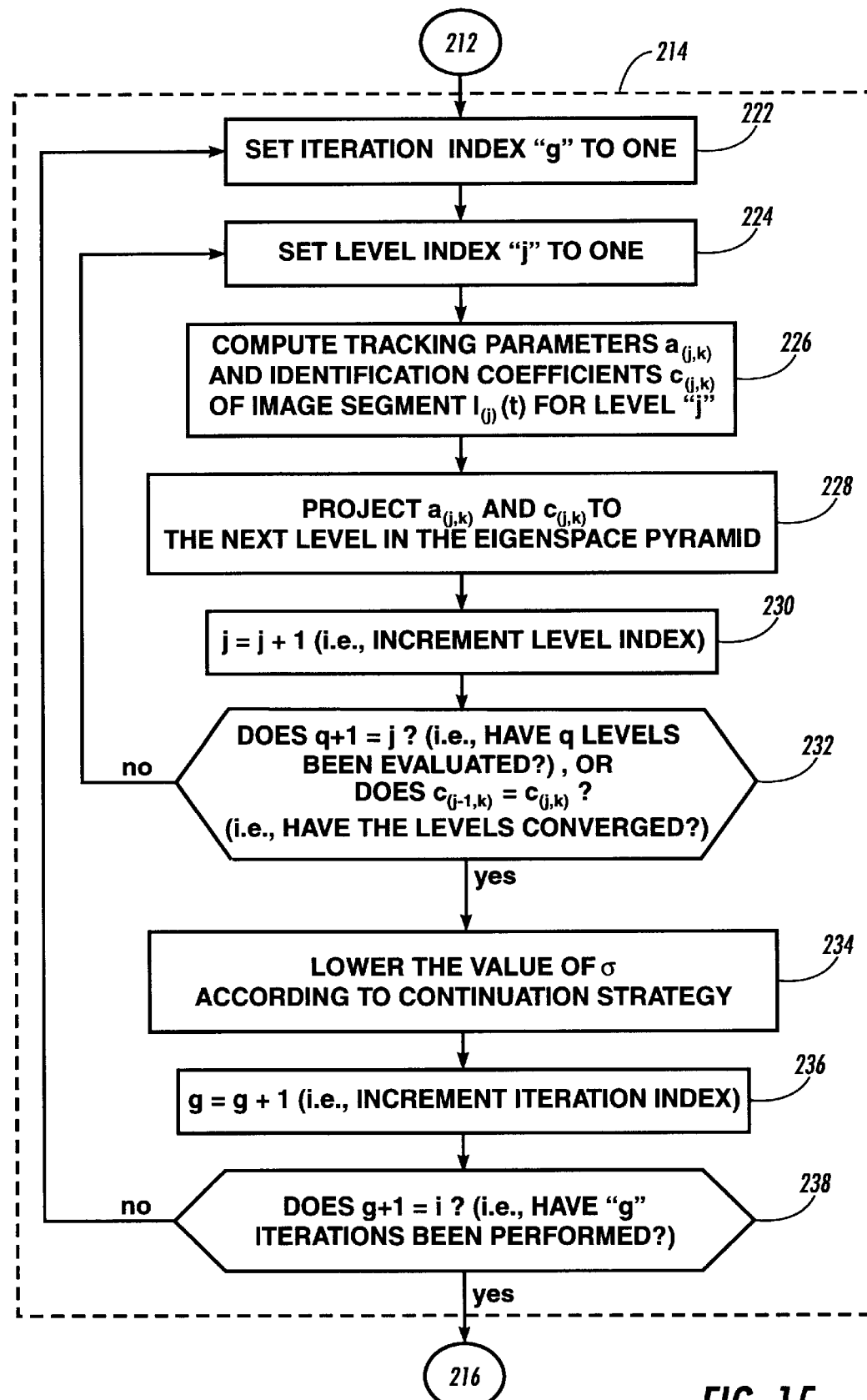
FIG. 15 illustrates a flow chart detailing step 214 shown in FIG. 14.

FIG. 15 illustrates a flow chart detailing step 214 shown in FIG. 14. Initially at step 222, an iteration index "g" is set to one. The iteration index "g" is used to count the number of iterations performed by evaluator 90 as indicated by arrows 92 and 94 in FIG. 10. At step 224, a level index "j" is set to one. When the level index is equal to one then the level index "j" identifies the coarsest level of the pyramid of training set images 28 corresponding to the computed set of basis images 39. However, when the level index "j" is equal to "q" then the level index identifies the finest level of resolution recorded for the training set of images 28 and its computed set of basis images 39.

At step 226, tracking parameters $a_{(j,k)}$ and the identification coefficients $c_{(j,k)}$ are computed for the image region $I_{(j)}(f)$ for a resolution level indicated by level index "j". At step 228, the tracking parameters $a_{(j,k)}$ and the identification coefficients $c_{(j,k)}$ computed at step 226 are projected to the next highest level in the eigenspace pyramid 14 at step 228. The tracking parameters $a_{(j,k)}$ can be projected to the next finer level of resolution by multiplying the coefficients $a_0$ and $a_3$ of the affine transformation by two. The projection of the identification coefficients $c_{(j,k)}$ may be more difficult, the details of which are disclosed in the Appendix. At step 230, the level index "j" is incremented by one. At step 232, a determination is made as to whether each of the "q" levels have been evaluated. When tracking parameters 4 and identification coefficients 5 have been evaluated for each of the "j" levels, step 234 is executed; otherwise, step 224 is repeated.

At step 234, the value of the scale parameter a is lowered according to a continuation strategy. The scale parameter σ is used to adjust the error norm, ρ, and the derivative of the error norm, ψ. The continuation method begins with a high value of σ that is lowered as the number of iterations increase. The effect of this continuation strategy is that initially no data is rejected as outliers. However, as the number of iterations increases, the influence of the outliers is gradually reduced. At step 236, the iteration index "g" is incremented. At step 238, a determination is made as to whether "g" iterations have been performed (i.e., as indicated by arrows 92 and 94 in FIG. 10). If "g" iterations have been performed step 216 is executed; otherwise, step 222 is repeated.

Figure 16:
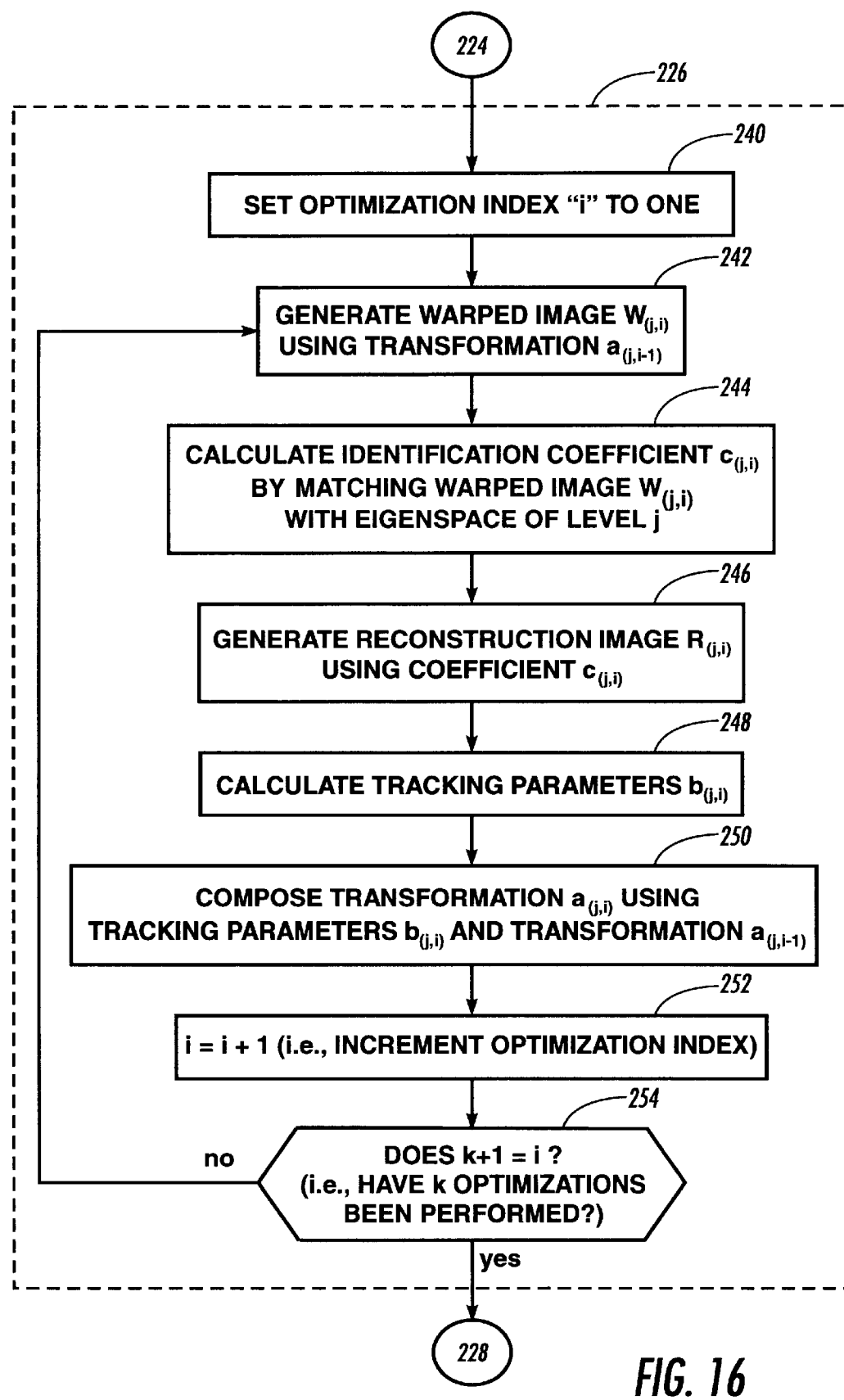
FIG. 16 illustrates a flow chart detailing step 226 shown in FIG. 15.

FIG. 16 illustrates a flow chart detailing step 226 shown in FIG. 15. At step 240, an optimization index "i" is set to one. The optimization index "i" keeps track of how many iterations are performed by the incremental refinement estimator 96 shown in detail in FIG. 12. After completing an iteration "i" tracking parameters $b_{(j,i)}$ are used to update the transformation $a_{(j,i)}$ which becomes a better estimate of the offset between the original image region $I_{(j)}$ and the set of basis images 39.

At step 242, a warped image $W_{(j,i)}$ is generated using the updated transformation $a_{(j,i-1)}$. In one instance, the updated transformation $a_{(j,i-1)}$ is projected from a coarser level (j−1), as show in FIG. 11 using projection operators 98. In another instance, if the iterative estimator is beginning its first level of "q" levels of iteration, the updated transformation is estimated using the transformation a* (shown in FIG. 10) from a previous frame in the image sequence. By estimating the transformation $a_{(j,i-1)}$ with the transformation computed from a previous frame, an object located and segmented in an image sequence at step 212 is tracked between frames. If no previous estimate for the transformation $a_{(j,i-1)}$ exists then the initial value of the transformation matrix $a_{(j,i-1)}$ is assumed to be zero. As discussed above, the image is warped using an affine transformation that represents horizontal and vertical translations, rotations, expansions/contractions, or stretching. In accordance with the invention, the transformation $a_{(j,i-1)}$ is applied in order to bring the object in the image region $i_{(j)}$ into a predetermined form for matching with an eigenspace.

At step 244, the warped image $W_{(j,i)}$ is matched with the set of basis images 39 of the level (j). An initial estimate of the identification coefficients $c_{(j,i)}$ is obtained from a previous level in a similar manner to which the initial estimate of the transformation $a_{(j-1,i)}$ is determined. That is, an initial estimate of the identification coefficients $c_{(j,i)}$ is determined with either updated identification coefficients $c_{(j,i-1)}$ that are projected to a coarser level or with identification coefficients c* (shown in FIG. 10) from a previous frame in the image sequence. Step 244 is performed by minimizing equation (4) (i.e., the robust subspace constancy objective function) with respect to the identification coefficients $c_{(j,i)}$ while holding the warping parameters $a_{(j,i)}$ fixed. Specifically, equation (4) is minimized by applying the robust formulation described above for matching an image with an eigenspace, with the only modification being that the image I(x) is replaced by the warped image I(x+u(x,a)).

At step 246, a reconstructed image $R_{(j,i)}$ (shown in FIG. 11) is generated using the identification coefficients $c_{(j,i)}$ computed at step 118. This reconstructed image $R_{(j,i)}$ is evaluated with respect to the warped image $W_{(j,i)}$ to determine tracking parameters $b_{(j,i)}$ at step 248. The tracking (or warp) parameters $b_{(j,i)}$ are calculated by minimizing equation (4) while holding the identification coefficients $c_{(j,i)}$ constant.

Accordingly, the tracking parameters $b_{(j,i)}$ are estimated using a coarse-to-fine strategy. with robust regression. Tracking parameters $b_{(j,i)}$ that define motion between the image $I_{(j)}$ and the set of basis images 39 are estimated by evaluating the optical flow between the two images $W_{(j,i)}$ and $R_{(j,i)}$ as shown in FIG. 11. The optical flow between two images is the apparent motion of brightness patterns. These brightness patterns move as objects that give rise to the patterns move. By making the assumption that brightness between two images does not change over time (i.e., the subspace constancy assumption), the optical flow between two images can be defined by the transformation $a_{(j,i)}$.

At step 250, the tracking parameters 4 (i.e., transformation $a_{(j,i-1)}$) are updated with the tracking parameters $b_{(j,i)}$ calculated at step 248 to define updated transformation $a_{(j,i)}$. This process of updating transformation $a_{(j,k)}$ is shown in detail in FIG. 12. At step 252, the optimization index is incremented. At step 254, if "k" optimizations have been performed then step 228 is executed; otherwise, step 242 is repeated.

Figure 17:
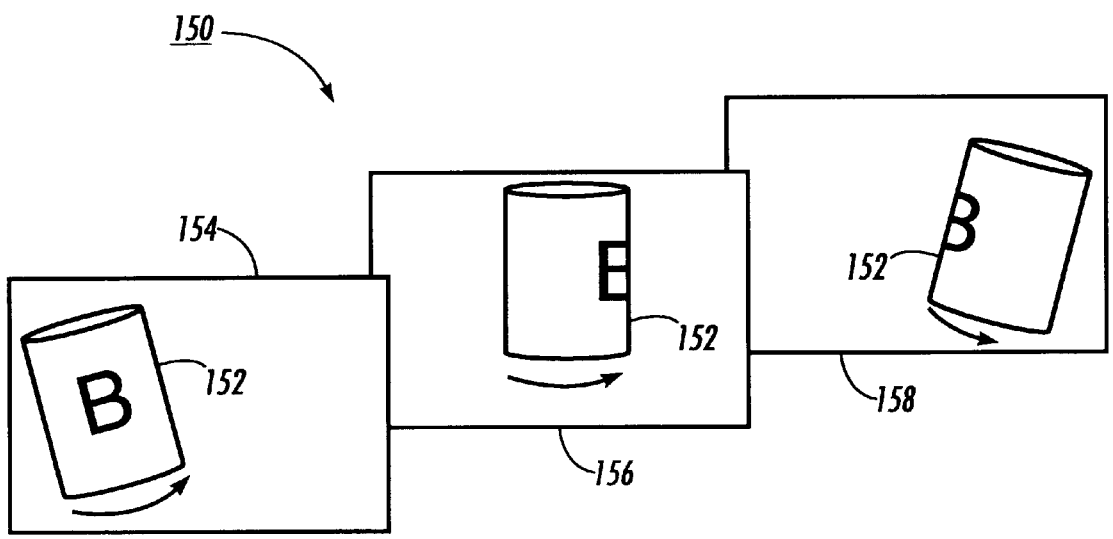
FIG. 17 illustrates an example where there exists a coherence of brightness patterns between an object undergoing affine image motions and changes in view between image frames of an image sequence.
Figure 18:
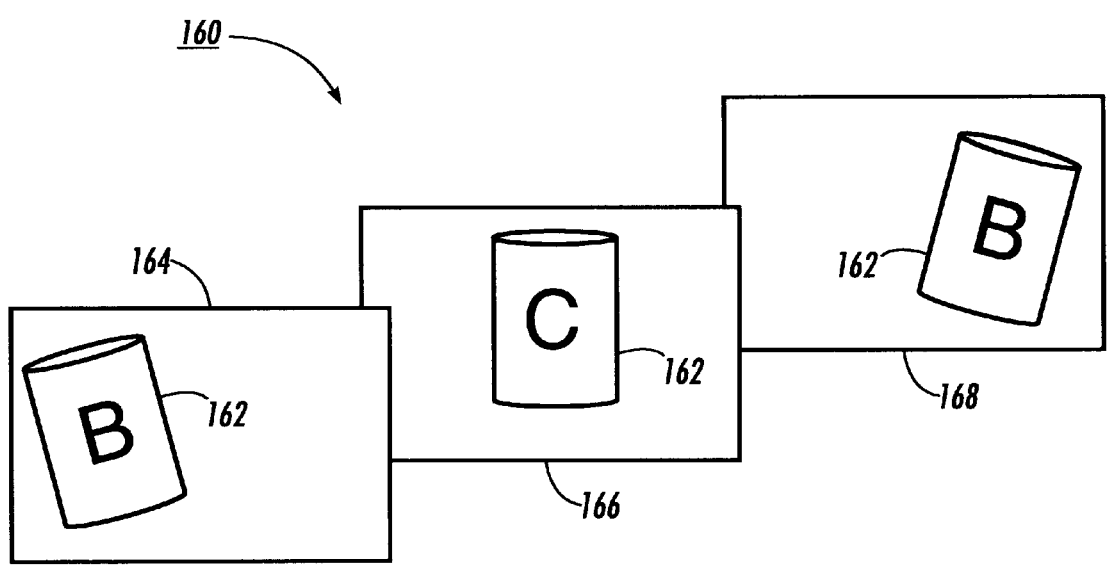
FIG. 18 illustrates an example where there exists a subspace coherence but there does not exist a coherence of brightness patterns between the frames of an image sequence.

D.4 Examples of Tracking Objects in a Sequence of Images with the Eigentracking System FIGS. 17 and 18 illustrate a sequence of images in which an object 152 is tracked using the eigentracking system 20. FIG. 17 illustrates three images 154, 156 and 158 defining a sequence of images 150. In the sequence of images 150, the object 152 rotates while changing position. In contrast, FIG. 18 illustrates a sequence of images 160 having three images 164, 166, and 168 in which an object 162 does not rotate but changes position and appearance. In other words, FIG. 17 illustrates a can 152 with the label "B" that is rotated through the sequence of images 74 while FIG. 18 illustrates the can 162 with the label "B" that changes to the label "C" and then back to the label "B". Accordingly, eigentracking system 20 simultaneously tracks an object's position through a sequence of images while recognizing changes in structure or view. That is, while an object moves and the view or structure of the object changes through the sequence of images, the eigentracking system 20 separately recovers the current view or structure of the object and the parameterized transformation between the current view and the eigenspace 14.

In general, FIGS. 17 and 18 illustrate an advantage of the invention and the difference between eigentracking and traditional motion based tracking methods. FIG. 17 is an example where there exists a coherence of brightness patterns between the object 152 undergoing affine image motions and changes in view between image frames 154, 156, and 158. In contrast, FIG. 18 is an example where there exists no coherence of brightness patterns between the frames of the image sequence 160, however, there does exist a subspace coherence. In accordance with the present invention, unlike traditional motion based tracking systems, the eigentracking system 20 can also successfully track the object 162 in which the identity of the object changes between the frames 164, 166, and 168. This advantage exists because the object 162 appearing in both the frames 164 and 166 are represented using the same eigenspace (or subspace). Accordingly, there exists a coherence between the frames 164 and 166 so that the object 162 is effectively tracked between frames.

E. Overview

It will no doubt be appreciated that there are a number of possible manners in which to implement the eigentracking system 20. It will be. understood by those skilled in the art that an eigenspace is not required for carrying out the present invention, and that any number of types of basis images can be used to approximate an original image. For example, neural networks, wavelet, or Fourier sets of basis images can be used. It will also be understood by those skilled in the art that other estimation techniques can be used besides a robust estimation technique. Other techniques include least squares regression analysis and correlation matching techniques. It will further be understood that the present invention can be used to track and identify a number of objects besides hands and cans.

Furthermore, it will be appreciated by those skilled in the art that the multi-scale eigenspace 14 is not required when there does not exist large transformations between the set of basis images 39 and the input image region. It will also be understood by those skilled in the art that the eigenspace does not have to remain fixed while an object in a sequence of images is tracked and evaluated for a match. Instead, an eigenspace or eigenpyramid can be dynamically modified by adding additional views not originally present in the training set of images. Dynamically adjusting an eigenspace may generate better matches and improve tracking. In addition, images forming the eigenspace can be preprocessed for smoothing or edge enhancement.

Also, it will be appreciated by those skilled in the art that the present invention can be use to identify and track something that is recorded in something other than an image. For example, the present invention can be used to evaluate depth or topographical maps. Additionally, it will be understood that the present invention is not limited to warping an input image towards an eigenspace with an affine transformation. Instead, any number of image transformation can be used to warp the input image towards the eigenspace such as translation, projective, and arbitrary non-linear deformations.

More details of the eigentracking system are disclosed by Black and Jepson in "EigenTracking: Robust Matching and Tracking of Articulated Objects Using A View-Based Representation," Proc. Fourth European Conf. on Computer Vision, ECCV'96, B. Buxton and R. Cipolla (Eds.), Springer Verlag, LNCS 1064, Cambridge, England, April 1996, pp. 329–342., the disclosure of which is incorporated herein by reference.

The disclosed eigentracking system may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized. The system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

Optimization Details and Implementation

A coarse-to-fine strategy is used to minimize the robust subspace constancy objective function set forth by equation (4). For each level of the multi-scale pyramid, say l=0, . . . , L, this objective function, $E_l(c_l, a_l)$, is $$\sum_x \rho(I_l(x + u(x, a_l)) - [U_l c_l](x), \sigma). \tag{A1}$$

Here l=0 corresponds to the full resolution level and l=L denotes the coarsest level.

The method for determining a solution is based on the application of two simpler techniques, one for minimizing the objective function with respect to c alone, the other for variations in a alone. These two techniques are presented below with respect for a single level.

Eigenspace Coefficients

First, equation (A1) is minimized with respect to c at some level l and some fixed value σ. (For convenience the level l is dropped from the notation.) Assuming that the initial guess is $(c^0, a^0)$, which is typically obtained from the previous level of the pyramid. A Gauss-Newton optimization scheme (See the following references for details: Bergen et al. in "Hierarchical Model-Based Motion Estimation," Proc. of Second European Conference on Computer Vision, ECCV-92, vol. 588 of LNCS-Series, pages 237–252, Springer-Verlag, May 1992; Black et al. "The Robust Estimation of Multiple Motions: Affine and piecewise-smooth flow fields," Technical Report P93-00104, Xerox PARC, December 1993; and Black et al. "A Framework for The Robust Estimation of Optical Flow," Proc. mt. Conf. on Computer Vision, ICCV-93. pages 231–236, Berlin, Germany, May 1993.) is used to update c according to:

$$c_i^{n+1} = c_i^n - \delta c_i,$$

where $\delta c_i$ is given by:

$$\delta c_i = \frac{1}{w(c_i)} \frac{\partial}{\partial c_i} E(c^n, a^0) = \tag{A2}$$

$$\frac{1}{w(c_i)} \sum_x U_i(x) \psi(I(x + u(x, a^0)) - [Uc^n](x), \sigma).$$

The normalizing term $w(c_i)$ is defined as:

$$w(c_i) = \sum_x \left(U \frac{\partial}{\partial c_i} c\right)^2 \max \psi' = \sum_x U_i^2 \max \psi',$$

where $U_i^2$ is the square of $U_i$ at pixel x, and $$\max \psi' = \max_x \frac{\partial^2}{\partial x^2} \rho(x, \sigma) = \frac{2}{\sigma^2}$$

for the robust error norm used herein. These updates are computed for k iterations, or until convergence.

Incremental Warp Linearization

Given the resulting value of c for some level I and some $\sigma$, the updates of the warp parameters, a, are considered. The general approach developed for the robust regression of optical flow disclosed by Black et al. above is used in this approach. Using this approach avoids the need to rewarp the image for each update of a by linearizing the variation of $I(x+u(x,a))$ with respect to a. In particular, setting $a=a^0+b$ and performing a Taylor's expansion in the incremental warp parameters b, provides:

$$I(x + u(x, a^0 + b)) = I + \nabla I \frac{\partial}{\partial a} u(x, a^0) b + O(\|b\|^2).$$

Here both I and $\Delta I=[I_x, I_y]$ are evaluated at $(x+u(x,a^0))$. Notice the affine displacement $u(x,a)$ used herein is a linear function of the warp parameter a, so that:

$$\frac{\partial}{\partial a} u(x, a^0) b = u(x, b).$$

Using this in the above Taylor's expansion, and substituting the result into equation (A1) gives:

$$\sum_x \rho(\nabla I(x + u(x, a^0)) \cdot u(x, b) + (I(x + u(x, a^0)) - [Uc](x)), \sigma).$$

which is referred to herein as the approximate objective function, $E^*(c,b)$. Notice that $E^*(c,b)$ takes the form of a robust motion constraint objective function (see Black et al. cited above), but here the out-of-subspace projection I–Uc plays the role of the temporal derivative.

The approximate objective function $E^*$ has three important properties. First notice that $E^*$ only involves the evaluation of I and $\Delta I$ at $(x+u(x,a^0))$, which does not depend on the incremental warp b. The need to recompute warps of I and $\Delta I$ during the computation of b is avoided; instead these quantities can be precomputed given the initial guess $a^0$.

Secondly $E^*$ is a good approximation of the original objective function for small incremental warps b. Indeed from the above derivation it follows that:

$$E(c, a^0 + b) = E^*(c, b) + O(\|b\|^2). \tag{A4}$$

In practice, the coarse-to-fine strategy will lead to estimated incremental warps of no more than a pixel or so (in the subsampled grid), in which case $E^*$ provides a close approximation of E. Therefore it is reasonable to attempt to minimize $E^*$ with respect to b in order to compute an update for $a^0$.

Finally, the third property of $E^*(c,b)$ is that if it has a minimum at b=0, then the gradient, $E_a(c,a^0)$, of the original objective function must also vanish (see equation (A4)). This is important since, upon convergence the overall method produces a negligible update b, and so this third property ensures that the original objective function $E(c,a^0)$ also has a zero gradient with respect to the warp parameters. That is, upon convergence, $(c,a^0)$ is a stationary point of the original objective function, typically a local minimum. Thus the error in approximating the original objective function by computationally convenient, $E^*$, vanishes upon convergence of the overall method.

Warp Parameters

The minimization of E(c,b) with respect to b is done using a similar Gauss-Newton algorithm to the one described above for updating c. That is, the updates for b are:

$$b_i^{n+1} = b_i^n - \delta b_i,$$

for $b^0=0$ and $$\delta b_i = \frac{1}{w(b_i)} \frac{\partial}{\partial b_i} E*(c, b) = \tag{A5}$$

$$\frac{1}{w(b_i)} \sum_x \nabla I \cdot \frac{\partial}{\partial b_i} u(x, b) \psi(\nabla I \cdot u(x, b) + (I - Uc), \sigma),$$

with I and $\Delta I$ evaluated at $(x+u(x,a^0))$. The normalization term $w(b_i)$ is defined as:

$$w(b_i) = \sum_x \left(\nabla I \cdot \frac{\partial}{\partial b_i} u(x, b)\right)^2 \max \psi',$$

where max $\psi$ is as above. Upon convergence of this iteration, or after a fixed number of steps, the new value of a is set to be $a^0+b$.

Multi-Scale Projection Operations

The overall method executes several coarse to fine sweeps, during which estimates for c and a obtained at one level are used to generate initial guesses at the next finer level. For the warp parameters, the updated a can be "projected" to the next finer scale simply by multiplying the affine parameters $a_0$ and $a_3$ by two.

The projection of the eigenspace coefficients c, however, can be more difficult. Suppose $c_{l+1}$ is the vector of eigenspace coefficients computed in the coarser level l+1. An initial guess is assumed to be $c_l^0$ for these coefficients at the next finger level. There are several ways to do this, depending on the structure of the basis vectors across scales.

One approach would be to simply use the robust fitting method discussed above. That is, first obtain a least squares estimate for the new coefficients $c_l$. Then use this estimate for the starting point of the method described above for updating c alone, gradually reducing a back down form a temporarily inflated value. As found in experiments, this approach has an empirical breakdown point of 30–50% outliers.

This strategy could be imporved by using some information about the spatial distribution of outliers, determined at the previous level l+1, to compute the initial estimate for $c_l$. In particular, for a residual reconstruction error $r_{l+1}(x) = I_{l+1} - U_{l+1}c_{l+1}$, define the weight $m_{l+1}(x)$ to be:

$$m_{l+1}(x) = \frac{1}{2}\psi(r_{l+1}(x), \sigma)/r_{l+1}(x).$$

These weights can be projected to level l in the pyramid and used to compute a weighted least-squares estimate of $c_l$. This approach should be able to downweight the majority of pixels at which there are outliers, thereby increasing the breakdown point.

In another embodiment, a simpler strategy can be used to project the eigenspace coefficients c. In this alternate embodiment, it is noted that the multi-scale pyramids in experiments exhibited the property that the $i^{th}$ basis function at level l+1, namely $U_{l+1,i}$, was well approximated y the filtered and subsampled version of the corresponding basis function at the next finer scale, $U_{l,i}$. Presumably this property arises from the correlation of information in the training set across scales. As a consequence, $c_l^0$, the initial guess for the expansion coefficients at the next finer scale is taken to be equal to $c_{l+1}$, the updated expansion coefficients at the coarser scale. It should be noted, though, that such a simple strategy is expected to work only when the eigenspace pyramids have this special structure.

What is claimed is:

1. An apparatus for identifying and tracking an object recorded in a sequence of images, comprising:
   a memory for recording a set of training images; the images in the set of training images recording different views of the object;
   means for generating a set of basis images corresponding to the set of training images recorded in said memory; the set of basis images characterizing variations of the views of the object in the set of training images; and
   means for evaluating each image in the sequence of images to identify changes in view and structure of the object while tracking the object through the sequence of images with tracking parameters and identification coefficients; said evaluating means incrementally refining the tracking parameters and the identification coefficients by aligning, matching, and reconstructing a view of the object in the image with the views of the object represented in the set of basis images.

2. The apparatus according to claim 1, wherein said evaluating means comprises:
   means for computing a warped image by applying a transformation to a first image in the sequence of images;
   means for matching the set of basis images with the warped image; said matching means providing the identification coefficients that define which basis images in the set of basis images characterize the view of the object in the warped image;
   means for generating a first reconstructed image using a combination of images in the set of basis images defined by the identification coefficients provided by said matching means;
   means for estimating the tracking parameters that identify motion of the object between the warped image and the first reconstructed image; and
   means for refining the transformation with the tracking parameters estimated by said motion estimation means.

3. The apparatus according to claim 2, further comprising means for updating the identification coefficients, said updating means computing a second warped image with said applying means using the refined transformation.

4. The apparatus according to claim 2, wherein said computing means uses the transformation to provide an estimated location of the object in a second image in the sequence of images; said computing means providing the estimated location to track the object between the first image and the second image.

5. The apparatus according to claim 2, further comprising:
   means for generating a multi-scale set of images and a multi-scale set of basis images; and
   means for evaluating the multi-scale set of images and the multi-scale set of basis images from a coarse resolution to a fine resolution, said evaluating means refining the transformation with said refining means at each resolution.

6. The apparatus according to claim 2, wherein the identification coefficients provided by said matching means provides an estimate of the view of the object in a second image in the image sequence.

7. The apparatus according to claim 1, wherein the view of the object in the image in the sequence of images is different from the views of the object in the training set of images.

8. The apparatus according to claim 1, wherein the object in the training set of images has a common orientation and scale.

9. The apparatus according to claim 1, wherein the set of basis images is an eigenspace.

10. A method for identifying and tracking an object recorded in a sequence of images, comprising the steps of:
    recording in a memory a set of training images; the images in the set of training images recording different views of the object;
    generating a set of basis images corresponding to the set of training images recorded by said recording step; the set of basis images characterizing variations of the different views of the object in the set of training images; and
    evaluating each image in the sequence of images to identify changes in view and structure of the object while tracking the object through the sequence of images with tracking parameters and identification coefficients; said evaluating step incrementally refining the tracking parameters and the identification coefficients by aligning, matching, and reconstructing a view of the object in the image with the views of the object represented in the set of basis images.

11. The method according to claim 10, wherein said evaluating step further comprises the step of computing a transformation that aligns the view of the object in a first image in the sequence of images with a view of the object in the set of basis images.

12. The method according to claim 11, wherein said evaluating step tracks the object in a second image in the sequence of images with the transformation.

13. The method according to claim 10, wherein said evaluating step further comprises the step of computing the identification coefficients that define which basis images in the set of basis images best approximate each image in the sequence of images.

14. The method according to claim 10, further comprising the steps of:

formulating a first reconstructed image that recovers features of the object in the image; and generating an outlier image that identifies points in the image that are excluded in the first reconstructed image.

15. The method according to claim 14, further comprising the step of generating a second reconstructed image by matching the outlier image with the set of basis images; the second reconstructed image recovering portions of the image that are omitted from the first reconstructed image.

16. The method according to claim 10, wherein said evaluating step comprises the step of minimizing the following objective function:

$$E(c, a) = \sum_x \rho(I(x + u(x, a)) - [Uc](x), \sigma),$$

where,

ρ=an error norm;
σ=a scale parameter;
I=an image in the sequence of images;
x=position [x,y] in the image I;
u(x,a)=a transformation;
a=tracking parameters of the transformation;
U=the set of basis images; and
c=identification coefficients of the set of basis images U.

17. The method according to claim 10, wherein said evaluating step comprises the steps of:

applying a transformation to the image in the sequence of images; said applying step computing a warped image;

matching the set of basis images with the warped image; said matching step providing the identification coefficients that define which basis images in the set of basis images characterize the view of the object in the warped image;

generating a reconstructed image using a combination of images in the set of basis images defined by the identification coefficients provided by said matching step;

estimating the tracking parameters that identify motion of the object between the warped image and the reconstructed image; and refining the transformation with the tracking parameters estimated by said motion estimation step.

18. The method according to claim 17, further comprising the steps of:

generating a multi-scale set of images and a multi-scale set of basis images; and calculating the multi-scale set of images and the multi-scale set of basis images from a coarse resolution to a fine resolution, said evaluating step refining the transformation with said refining step at each resolution.

19. A program storage device readable by a machine, tangibly embodying a program of instructions executable by the machine to perform method steps for identifying and tracking an object recorded in a sequence of images, said method steps comprising:

recording in a memory a set of training images; the images in the set of training images recording different views of the object;

generating a set of basis images corresponding to the set of training images recorded by said recording step; the set of basis images characterizing variations of the different views of the object in the set of training images; and evaluating each image in the sequence of images to identify changes in view and structure of the object while tracking the object through the sequence of images with tracking parameters and identification coefficients; said evaluating step incrementally refining the tracking parameters and the identification coefficients by aligning, matching, and reconstructing a view of the object in the image with the views of the object represented in the set of basis images.

20. The program storage device as recited in claim 19, wherein said method evaluating step further comprise the steps of:

applying a transformation to the image in the sequence of images; said applying step computing a warped image;

matching the set of basis images with the warped image; said matching step providing the identification coefficients that define which basis images in the set of basis images characterize the view of the object in the warped image;

generating a reconstructed image using a combination of images in the set of basis images defined by the identification coefficients provided by said matching step;

estimating the tracking parameters that identify motion of the object between the warped image and the reconstructed image; and refining the transformation with the tracking parameters estimated by said motion estimation step.

* * * * *